(12) United States Patent
Fonte

(10) Patent No.: US 11,498,751 B2
(45) Date of Patent: Nov. 15, 2022

(54) SYSTEM FOR PROVIDING A SINGLE SERVING OF A FROZEN CONFECTION

(71) Applicant: Sigma Phase, Corp., Billerica, MA (US)

(72) Inventor: Matthew Fonte, Concord, MA (US)

(73) Assignee: ColdSnap, Corp., Billerica, MA (US)

( * ) Notice: Subject to any disclaimer, the term of this patent is extended or adjusted under 35 U.S.C. 154(b) by 195 days.

(21) Appl. No.: 17/025,813

(22) Filed: Sep. 18, 2020

(65) Prior Publication Data

US 2021/0002067 A1 Jan. 7, 2021

Related U.S. Application Data

(63) Continuation of application No. 16/518,045, filed on Jul. 22, 2019, which is a continuation of application No. 15/625,690, filed on Jun. 16, 2017, now Pat. No. 10,358,284.

(60) Provisional application No. 62/351,001, filed on Jun. 16, 2016.

(51) Int. Cl.
*A23G 9/12* (2006.01)
*A23G 9/22* (2006.01)
*A23G 9/28* (2006.01)
*B65D 41/04* (2006.01)
(Continued)

(52) U.S. Cl.
CPC ........... *B65D 85/8061* (2020.05); *A23G 9/12* (2013.01); *A23G 9/22* (2013.01); *A23G 9/224* (2013.01); *A23G 9/28* (2013.01); *B65D 41/04* (2013.01); *B65D 51/32* (2013.01)

(58) Field of Classification Search
CPC ............. A23G 9/12; A23G 9/224; A23G 9/28
See application file for complete search history.

(56) References Cited

U.S. PATENT DOCUMENTS

| 1,438,523 A | 12/1922 | Duren |
| 1,555,701 A | 9/1925 | Prichard et al. |
| 1,944,114 A | 1/1934 | Snowlund |

(Continued)

FOREIGN PATENT DOCUMENTS

| CN | 203314023 | 12/2013 |
| CN | 106492721 | 3/2017 |

(Continued)

OTHER PUBLICATIONS

EP European Search Report, in European Appln. No. 21181499.1, dated Nov. 3, 2021, 14 pages.

(Continued)

*Primary Examiner* — Ana M Vazquez
(74) *Attorney, Agent, or Firm* — Fish & Richardson P.C.

(57) ABSTRACT

A machine for providing a single serving of a cold beverage or a frozen confection is disclosed. The machine includes a cooling system, a first assembly, and a second assembly. The first assembly includes the cooling system and has sidewalls partially defining a recess for receiving a pod containing at least one ingredient for forming the single serving of the cold beverage or frozen confection and at least one internal paddle. The second assembly has a lid and a plunger movably mounted to the lid. The plunger is operable to engage a top of the pod and rotate the at least one internal paddle of the pod to scrape the cold beverage or a frozen confection off a wall of the pod and mix contents of the pod.

23 Claims, 19 Drawing Sheets

(51) Int. Cl.
 B65D 51/32 (2006.01)
 B65D 85/804 (2006.01)

(56) References Cited

U.S. PATENT DOCUMENTS

| | | | |
|---|---|---|---|
| 2,350,534 A | 6/1944 | Arthur | |
| 2,518,758 A | 8/1950 | Cook | |
| 2,541,814 A | 2/1951 | Gaddini | |
| 2,577,916 A | 12/1951 | Rollman | |
| 3,061,280 A | 10/1962 | Kraft et al. | |
| 3,323,320 A * | 6/1967 | Conz | A23G 9/16 366/323 |
| 3,393,900 A | 7/1968 | Wagner et al. | |
| 3,635,147 A | 1/1972 | Lee | |
| 3,896,959 A | 7/1975 | Roy | |
| 3,914,673 A | 10/1975 | Wallin | |
| 3,951,289 A | 4/1976 | Landen | |
| 4,110,476 A | 8/1978 | Rhodes | |
| 4,162,855 A | 7/1979 | Bender | |
| 4,359,283 A | 11/1982 | McClellan | |
| 4,408,690 A | 10/1983 | Ferrero | |
| 4,535,604 A | 8/1985 | Cavalli et al. | |
| 4,538,427 A | 9/1985 | Cavalli | |
| 4,563,880 A | 1/1986 | Cipelletti | |
| 4,568,192 A | 2/1986 | Kudermann | |
| 4,573,329 A | 3/1986 | Cavalli | |
| 4,583,863 A | 4/1986 | Pandolfi | |
| 4,632,566 A | 12/1986 | Masel et al. | |
| 4,635,560 A | 1/1987 | Ballantyne | |
| 4,664,529 A | 5/1987 | Cavalli | |
| 4,784,866 A | 11/1988 | Wissgott | |
| 4,784,886 A | 11/1988 | Wissgott | |
| 4,796,440 A | 1/1989 | Shiotani et al. | |
| 4,827,732 A | 5/1989 | Suyama et al. | |
| 4,838,702 A * | 6/1989 | Torimitsu | A23G 9/228 366/144 |
| 4,885,917 A | 12/1989 | Spector | |
| 4,910,972 A | 3/1990 | Jaster | |
| 4,913,645 A | 4/1990 | Daouse et al. | |
| 4,926,390 A | 5/1990 | Murzsa | |
| 4,993,238 A | 2/1991 | Inagaki | |
| 5,264,237 A | 11/1993 | Traitler et al. | |
| 5,331,820 A | 7/1994 | Faries et al. | |
| 5,343,710 A | 9/1994 | Cathenaut et al. | |
| 5,363,746 A | 11/1994 | Gordon | |
| 5,435,143 A | 7/1995 | Heinrich | |
| 5,447,036 A | 9/1995 | Heinrich | |
| 5,533,800 A | 7/1996 | Stiegelmann et al. | |
| 5,549,042 A | 8/1996 | Bukoschek et al. | |
| 5,556,659 A | 9/1996 | De Pedro et al. | |
| 5,568,729 A | 10/1996 | Heinrich et al. | |
| 5,571,282 A | 11/1996 | Earle | |
| 5,603,965 A | 2/1997 | Daouse | |
| 5,692,633 A | 12/1997 | Gordon | |
| 5,823,675 A | 10/1998 | Myerly | |
| 5,834,739 A | 11/1998 | Lockwood et al. | |
| 5,843,512 A | 12/1998 | Daouse et al. | |
| 5,879,731 A | 3/1999 | Beckett et al. | |
| 5,888,562 A | 3/1999 | Hansen et al. | |
| 5,888,567 A | 3/1999 | Daouse | |
| 5,932,275 A | 8/1999 | Nalur | |
| 5,955,136 A | 9/1999 | Laaman et al. | |
| 5,967,381 A | 10/1999 | Van Zeeland et al. | |
| 6,004,606 A | 12/1999 | French et al. | |
| 6,012,383 A | 1/2000 | Lande | |
| 6,045,836 A | 4/2000 | Saunier et al. | |
| 6,060,094 A | 5/2000 | Nalur | |
| 6,071,546 A | 6/2000 | Nalur | |
| 6,089,747 A | 7/2000 | Huanu | |
| 6,174,157 B1 | 1/2001 | Daouse et al. | |
| 6,194,014 B1 | 2/2001 | Busse et al. | |
| 6,210,739 B1 | 4/2001 | Nalur | |
| 6,220,047 B1 | 4/2001 | Vogel et al. | |
| 6,221,409 B1 | 4/2001 | Bueno Ceresuela | |
| 6,251,455 B1 | 6/2001 | Thomas | |
| 6,251,456 B1 | 6/2001 | Maul et al. | |
| 6,267,049 B1 | 7/2001 | Silvano | |
| 6,267,073 B1 | 7/2001 | Busse et al. | |
| 6,272,974 B1 | 8/2001 | Pascotti et al. | |
| 6,280,783 B1 | 8/2001 | Blaschke et al. | |
| 6,284,294 B1 | 9/2001 | French et al. | |
| 6,299,923 B1 | 10/2001 | Meziane | |
| 6,338,569 B1 | 1/2002 | McGill | |
| 6,338,863 B1 | 1/2002 | Amiel et al. | |
| 6,340,488 B1 | 1/2002 | French et al. | |
| 6,379,724 B1 | 4/2002 | Best et al. | |
| 6,399,134 B1 | 6/2002 | Best et al. | |
| 6,413,563 B1 | 7/2002 | Blaschke et al. | |
| 6,431,395 B1 | 8/2002 | San Martin et al. | |
| 6,444,044 B1 | 9/2002 | Beckett et al. | |
| 6,454,455 B1 | 9/2002 | Jungvig | |
| 6,479,085 B1 | 11/2002 | Archibald | |
| 6,524,634 B2 | 2/2003 | Busse et al. | |
| 6,524,635 B1 | 2/2003 | Aebi | |
| 6,531,169 B2 | 3/2003 | Best et al. | |
| 6,548,097 B1 | 4/2003 | Best et al. | |
| 6,565,902 B2 | 5/2003 | Ruano Del Campo et al. | |
| 6,579,375 B2 | 6/2003 | Beckett et al. | |
| 6,592,928 B2 | 7/2003 | Makela et al. | |
| 6,616,963 B1 | 9/2003 | Zerby et al. | |
| 6,623,784 B2 | 9/2003 | Zerby et al. | |
| 6,627,239 B1 | 9/2003 | Gavie et al. | |
| 6,645,538 B2 | 11/2003 | Best et al. | |
| 6,689,406 B2 | 2/2004 | Kuehl et al. | |
| 6,713,101 B2 | 3/2004 | Lometillo et al. | |
| 6,726,944 B2 | 4/2004 | Blaschke et al. | |
| 6,739,475 B2 | 5/2004 | San Martin et al. | |
| 6,758,056 B1 | 7/2004 | Cathenaut et al. | |
| 6,790,467 B2 | 9/2004 | Kostival et al. | |
| 6,818,238 B2 | 11/2004 | Napolitano et al. | |
| 6,820,765 B2 | 11/2004 | Pahl | |
| 6,824,808 B2 | 11/2004 | Best et al. | |
| 6,835,406 B1 | 12/2004 | Wurzel et al. | |
| 6,861,082 B2 | 3/2005 | Laffont et al. | |
| 6,890,577 B2 | 5/2005 | Vaghela et al. | |
| 6,936,794 B2 | 8/2005 | Zhang et al. | |
| 6,942,885 B2 | 9/2005 | Ross et al. | |
| 6,971,248 B1 | 12/2005 | Wiggs | |
| 7,211,283 B2 | 5/2007 | Jones et a | |
| 7,314,307 B2 | 1/2008 | Cai | |
| 7,407,681 B2 | 8/2008 | Marchon et al. | |
| 7,451,613 B2 | 11/2008 | Barraclough et al. | |
| 7,513,213 B2 | 4/2009 | Mange et al. | |
| 7,619,188 B2 | 11/2009 | Oghafua et al. | |
| 7,650,834 B2 | 1/2010 | Bravo | |
| 7,658,960 B2 | 2/2010 | Thomas et al. | |
| 7,727,573 B2 | 6/2010 | Vaghela et al. | |
| 7,730,831 B2 | 6/2010 | Mange et al. | |
| 7,736,681 B2 | 6/2010 | Belzowski et al. | |
| 7,754,260 B2 | 7/2010 | Kruik et al. | |
| 7,918,334 B2 | 4/2011 | Gaetano et al. | |
| 8,182,853 B2 | 5/2012 | Puaud et al. | |
| 8,273,392 B2 | 9/2012 | Ho et al. | |
| 8,347,808 B2 | 1/2013 | Belzowski et al. | |
| 8,425,967 B2 | 4/2013 | Vaghela et al. | |
| 8,459,497 B2 | 6/2013 | Milan | |
| 8,628,811 B2 | 1/2014 | Panyam et al. | |
| 8,685,477 B2 | 4/2014 | Almblad et al. | |
| 8,720,493 B2 | 5/2014 | Dose et al. | |
| 8,777,057 B2 | 7/2014 | Fiedler | |
| 8,784,091 B2 | 7/2014 | Henriet et al. | |
| 8,840,943 B2 | 9/2014 | Amend | |
| 8,844,426 B2 | 9/2014 | Ochoa et al. | |
| 8,877,179 B2 | 11/2014 | Mercenier et al. | |
| 8,906,437 B2 | 12/2014 | Green et al. | |
| 8,936,821 B2 | 1/2015 | Ummadi et al. | |
| 8,940,352 B2 | 1/2015 | Ambrogi et al. | |
| 8,960,992 B2 | 2/2015 | de Jong | |
| 8,960,999 B1 | 2/2015 | Ochoa et al. | |
| 8,980,354 B2 | 3/2015 | Harlaux-Pasquier et al. | |
| 9,155,322 B2 | 10/2015 | Ricco et al. | |
| 9,232,811 B2 | 1/2016 | Panyam et al. | |
| 9,242,387 B2 | 1/2016 | Amend et al. | |
| 9,253,993 B2 | 2/2016 | Ummadi et al. | |

(56) References Cited

U.S. PATENT DOCUMENTS

| | | |
|---|---|---|
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,314,320 B2 | 6/2019 | Roberts et al. |
| 10,334,868 B2 | 7/2019 | Fonte |
| 10,368,680 B2 | 8/2019 | Ryan |
| 10,426,180 B1 | 10/2019 | Fonte |
| 10,543,978 B1 | 1/2020 | Fonte et al. |
| 10,604,337 B2 | 3/2020 | Fonte et al. |
| 10,612,835 B2 | 4/2020 | Fonte et al. |
| 10,667,542 B2 | 6/2020 | Fonte |
| 10,752,432 B2 | 8/2020 | Fonte et al. |
| 10,782,049 B1 | 9/2020 | Fonte et al. |
| 10,830,529 B2 | 11/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 11,175,075 B2 | 11/2021 | Flynn et al. |
| 11,230,429 B2 | 1/2022 | Fonte et al. |
| 11,279,609 B2 | 3/2022 | Fonte et al. |
| 11,280,543 B2 | 3/2022 | Fonte et al. |
| 11,311,026 B2 | 4/2022 | Fonte et al. |
| 11,337,438 B2 | 5/2022 | Fonte et al. |
| 11,337,439 B2 | 5/2022 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0020659 A1 | 2/2002 | Sweeney et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0263490 A1 | 11/2006 | Wall et al. |
| 2006/0266751 A1 | 11/2006 | Alt et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0110559 A1 | 4/2009 | Bell et al. |
| 2009/0110786 A1 | 4/2009 | Wells |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1 | 9/2009 | Edwards et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0108696 A1 | 5/2010 | Farrell et al. |
| 2010/0124599 A1 | 5/2010 | Saikali et al. |
| 2010/0132310 A1 | 6/2010 | Dose et al. |
| 2010/0175390 A1 | 7/2010 | Jejcic |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0142996 A1 | 6/2011 | Kruger |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0098088 A1 | 4/2013 | Lin et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0106055 A1 | 4/2014 | Gamay |

(56) References Cited

U.S. PATENT DOCUMENTS

| | | |
|---|---|---|
| 2014/0123859 A1 | 5/2014 | Verbeek |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0211586 A1 | 7/2014 | Conti |
| 2014/0231562 A1 | 8/2014 | Potter et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0201810 A1 | 7/2015 | Sands |
| 2015/0219506 A1 | 8/2015 | Izadi-Zamanabadi et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0329282 A1 | 11/2015 | Bartoli et al. |
| 2015/0351426 A1 | 12/2015 | Ricco et al. |
| 2015/0351430 A1 | 12/2015 | Pipe et al. |
| 2015/0353261 A1 | 12/2015 | Gupta |
| 2016/0051081 A1 | 2/2016 | Grassia et al. |
| 2016/0135479 A1 | 5/2016 | Ummadi et al. |
| 2016/0176624 A1 | 6/2016 | Talon |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0332188 A1 | 11/2016 | Agnello |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0112326 A1 | 4/2017 | Ochoa et al. |
| 2017/0173544 A1 | 6/2017 | Laby |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0332844 A1 | 11/2017 | Behar et al. |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0056256 A1 | 3/2018 | Sun et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0117545 A1 | 5/2018 | Noth |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0177545 A1 | 5/2018 | Noth |
| 2018/0169599 A1 | 6/2018 | Ahmad et al. |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0069725 A1 | 3/2019 | Wang et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0313665 A1 | 10/2019 | Fonte |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0330038 A1 | 10/2019 | Melrose |
| 2019/0344955 A1 | 11/2019 | Fonte |
| 2019/0357564 A1 | 11/2019 | Yang et al. |
| 2020/0022382 A1 | 1/2020 | Fonte |
| 2020/0055664 A1 | 2/2020 | Fonte et al. |
| 2020/0055665 A1 | 2/2020 | Fonte et al. |
| 2020/0056814 A1 | 2/2020 | Fonte et al. |
| 2020/0056835 A1 | 2/2020 | Fonte et al. |
| 2020/0146308 A1 | 5/2020 | Roberts et al. |
| 2020/0146311 A1 | 5/2020 | Halachmi |
| 2020/0245818 A1 | 8/2020 | Halkes et al. |
| 2020/0292212 A1 | 9/2020 | Fonte et al. |
| 2020/0292229 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2020/0378659 A1 | 12/2020 | Novak et al. |
| 2021/0002066 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0076694 A1 | 3/2021 | Prewett et al. |
| 2021/0084930 A1 | 3/2021 | Fonte |
| 2021/0127706 A1 | 5/2021 | Fonte |
| 2021/0130083 A1 | 5/2021 | Fonte et al. |
| 2021/0212337 A1 | 7/2021 | Fonte et al. |
| 2021/0212338 A1 | 7/2021 | Fonte et al. |
| 2021/0368819 A1 | 12/2021 | Fonte et al. |
| 2021/0368820 A1 | 12/2021 | Fonte et al. |
| 2021/0371265 A1 | 12/2021 | Fonte et al. |
| 2022/0127070 A1 | 4/2022 | Fonte et al. |

FOREIGN PATENT DOCUMENTS

| | | |
|---|---|---|
| DE | 1211905 | 3/1966 |
| DE | 202004005357 | 7/2004 |
| EP | 0471904 | 2/1992 |
| EP | 1009678 | 6/2000 |
| EP | 1139837 | 10/2001 |
| EP | 1415543 | 5/2004 |
| EP | 1907300 | 4/2008 |
| EP | 2266418 | 12/2010 |

(56) References Cited

FOREIGN PATENT DOCUMENTS

| | | |
|---|---|---|
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 2501009 | 9/1982 |
| FR | 2501080 | 9/1982 |
| GB | 978808 | 12/1964 |
| JP | H11507295 A | 6/1999 |
| JP | 2002/068304 A | 3/2002 |
| JP | 2005/318869 | 11/2005 |
| JP | 2006-027662 | 2/2006 |
| WO | WO 1996/001224 | 1/1996 |
| WO | WO 1998/046486 | 10/1998 |
| WO | WO 2004/054380 | 7/2004 |
| WO | WO 2015/077825 | 11/2006 |
| WO | WO 2010/103483 | 9/2010 |
| WO | WO 2010/149509 | 12/2010 |
| WO | WO 2013/121421 | 8/2013 |
| WO | WO 2015/063092 | 5/2015 |
| WO | WO 2015/063094 | 5/2015 |
| WO | WO 2015/077825 | 6/2015 |
| WO | WO 2015/169841 | 11/2015 |
| WO | WO 2016/079641 | 5/2016 |
| WO | WO 2016/081477 | 5/2016 |
| WO | WO 2017/087970 | 5/2017 |
| WO | WO 2017/139395 | 8/2017 |
| WO | WO 2017/176580 | 10/2017 |
| WO | WO 2017/214357 | 12/2017 |
| WO | WO 2018/109765 | 6/2018 |
| WO | WO 2019/117804 | 6/2019 |
| WO | WO 2019/140251 | 7/2019 |
| WO | WO 2019/171588 | 9/2019 |
| WO | WO 2020/037287 | 2/2020 |
| WO | WO 2020/037293 | 2/2020 |
| WO | WO 2020/037296 | 2/2020 |
| WO | WO 2020039439 | 2/2020 |
| WO | WO 2020053859 | 3/2020 |
| WO | WO 2020089919 | 5/2020 |
| WO | WO 2020/163369 | 8/2020 |

OTHER PUBLICATIONS

EP Office Action by European Appln. No. 19762064.4, dated Oct. 25, 2021, 10 pages.

PCT International Search Report and Written Opinion in International Appln. No. PCT/US2021/035260, dated Oct. 1, 2021, 18 pages.

U.S. Appl. No. 10/279,973, filed May 7, 2019, Butscher et al.

U.S. Appl. No. 10/358,284, filed Jul. 23, 2019, Fonte.

Allpax, "Shaka Retorts 1300 and 1600," 2020, retrieved Apr. 16, 2020 from URL <https://www.allpax.com/products/production-shaka-retorts/>, 4 pages.

Arellano et al., "Online ice crystal size measurements during sorbet freezing by means of the focused beam reflectance measurement (FBRM) technology," Influence of Operating Conditions, Journal of Food Engineering, Nov. 1, 2012, 1;113(2):351-9.

Caldwell et al., "A low-temperature scanning electron microscopy study of ice cream. II. Influence of selected ingredients and processes," Food Structure, 1992; 11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <https://www.ditusa.com/sc_helicone_mixers.php>, 3 pages.

Drewett et al., "Ice crystallization in a scraped surface freezer," Journal of Food Engineering, Feb. 1, 2007, 78(3):1060-6.

EP Extended Search Report in European Appln. No. 17814210.5, dated Jan. 24, 2020, pp. 1-3 of 12 pages.

Gonzalez-Ramirez et al., "Moments model for a continuous sorbet crystallization process," The 23rd IIR International Congress of Refrigeration, Refrigeration for Sustainable Development, Prague, Czech Republic, Aug. 2011, 21-6.

Hagiwara et al., "Effect of sweetener, stabilizer, and storage temperature on ice recrystallization in ice cream," Journal of Dairy Science, May 1, 1996, 79(5):735-44.

Ice Cream Science, "How Long Does Homemade Ice Cream Last in the Freezer," Jun. 3, 2016, retrieved Apr. 16, 2020 form URL <http://icecreamscience.com/long-ice-cream-last-freezer/, 18 pages.

Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.

Inoue et al., "Modeling of the effect of freezer conditions on the principal constituent parameters of ice cream by using response surface methodology," Journal of Dairy Science, May 1, 2008, 91(5):1722-32.

PCT Authorized Officer Gwenaelle Llorca, European Patent Office, International Application No. PCT/US2019/013286, "Invitation to Pay Additional Fees and, Where Applicable, Protest Fee", International Searching Authority, dated Apr. 4, 2019, pp. 1-16 of 19 pages.

PCT International Search Report and Written Opinion in International Appln. No. PCT/US17/37972, dated Oct. 27, 2017, 16 pages.

PCT International Search Report and Written Opinion in International Appln. No. PCT/US19/13286, dated May 31, 2019, 21 pages.

PCT International Report on Patentability in International Appln. No. PCT/2019/013286, dated Jul. 23, 2020, 16 pages.

PCT International Search Report and Written Opinion in International Appln. No. PCT/US2019/013286, dated Jan. 11, 2019, 21 pages.

PCT International Search Report and Written Opinion in International Appln. No. PCT/US2019/046946, dated Jan. 24, 2020, 24 pages.

PCT International Search Report and Written Opinion in International Appln. No. PCT/US2019/046954, dated Nov. 21, 2019, 20 pages.

PCT Invitation to Pay Additional Fees in International Appln. No. PCT/US2019/046946, dated Dec. 2, 2019, 19 pages.

Reichart, "Speed of Dasher and Scraper as Affecting the Quality of Ice Cream and Sherbet," Journal of Dairy Science, Mar. 1, 1931, 14(2):107-15.

Shaka Process, "Higher Quality Ambient Foods," 2018, retrieved Apr. 16, 2020 from URL <http://shakaprocess.com/>, 2 pages.

Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.

US Notice of Allowance in U.S. Appl. No. 16/592,031, dated Jan. 10, 2020, 8 pages.

Waste Management Inc. et al "Tip: Aluminum Trays and Pans Are Recyclable," Nov. 2016 pp. 1-2 https://www.stocktonrecycles.conn/alunninunn-trays-pans-recyclable/.

Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.

Hosford et al., "The aluminum beverage can," Scientific American, Sep. 1, 1994, 271(3):48-53.

PCT International Search Report and Written Opinion in International Appln. No. PCT/US2021/013619, dated Jun. 2, 2021, 17 pages.

EP Office Action by European Appln. No. 19762063.6, dated Feb. 11, 2022, 6 pages.

Ice Cream, 2nd Edition, Arbuckle, 1972, pp. 96 and 240.

PCT International Preliminary Report on Patentability in International Appln. No. PCT/US17/37972, dated Dec. 18, 2018, 12 pages.

PCT International Preliminary Report on Patentability in International Appln. No. PCT/US2020/051664, dated Mar. 31, 2022, 12 pages.

PCT International Search Report and Written Opinion in International Appln. No. PCT/US2019/046958, dated Jan. 24, 2020, 25 pages.

PCT International Search Report and Written Opinion in International Appln. No. PCT/US2022/070483, dated May 23, 2022, 15 pages.

(56) References Cited

OTHER PUBLICATIONS

PCT International Preliminary Report on Patentability in International Appln. No. PCT/US2019/046946, dated Feb. 23, 2021, 16 pages.
PCT International Preliminary Report on Patentability in International Appln. No. PCT/US2019/046958, dated Feb. 23, 2021, 17 pages.
PCT International Preliminary Report on Patentability in International Appln. No. PCT/US2019/046954, dated Feb. 23, 2021, 14 pages.
EP European Search Report in European Appln. No. 21199252.4, dated Feb. 2, 2022, 11 pages.
EP European Search Report in European Appln. No. 21199245.8, dated Feb. 2, 2022, 12 pages.
EP European Search Report in European Appln. No. 21199250.8, dated Feb. 2, 2022, 13 pages.
EP European Search Report in European Appln. No. 21199240.9, dated Feb. 2, 2022, 13 pages.
EP European Search Report in European Appln. No. 21199244.1, dated Feb. 2, 2022, 13 pages.
EP European Search Report in European Appln. No. 21199271.4, dated Feb. 2, 2022, 8 pages.
JP Office Action in Japanese Appln. No. 2019-518176, dated Jan. 6, 2021, 8 pages (with English translation).
PCT International Search Report and Written Opinion in International Appln. No. PCT/US2020/051664, dated Dec. 17, 2020, 44 pages.

* cited by examiner

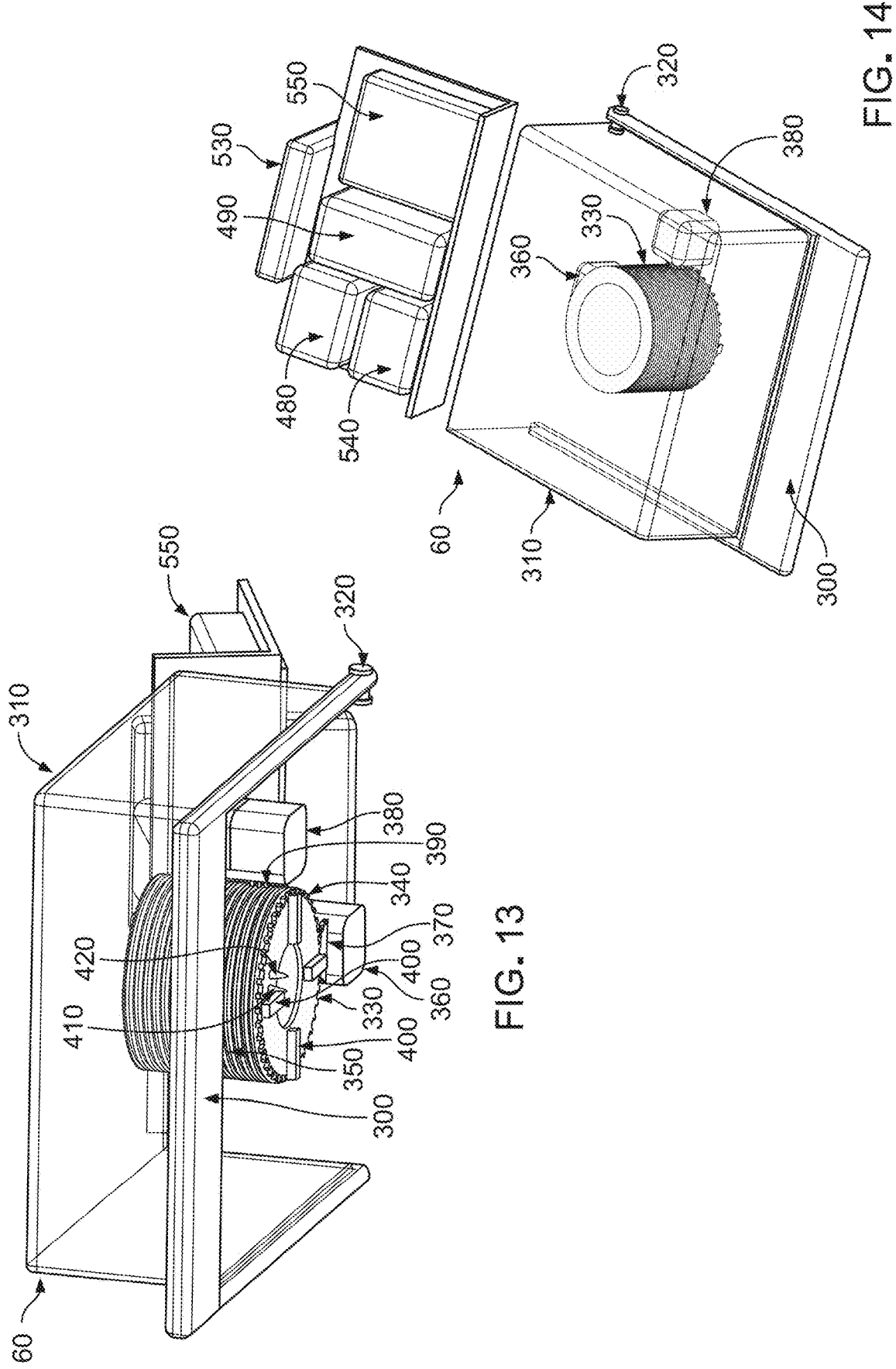

SYSTEM FOR PROVIDING A SINGLE SERVING OF A FROZEN CONFECTION

REFERENCE TO PENDING PRIOR PATENT APPLICATION

This patent application is a continuation of U.S. patent application Ser. No. 16/518,045, filed Jul. 22, 2019, which is a continuation of U.S. patent application Ser. No. 15/625,690, filed Jun. 16, 2017, now U.S. Pat. No. 10,358,284, issued Jul. 23, 2019, which claims benefit of U.S. Provisional Patent Application Ser. No. 62/351,001, filed Jun. 16, 2016, the disclosures of each of which are incorporated herein by reference in their entireties

FIELD

This invention relates generally to systems for providing a frozen confection (e.g., ice cream, frozen yogurt, smoothies, etc.), and more particularly to systems for providing a single serving of a frozen confection.

BACKGROUND

Current domestic ice cream makers are generally designed to produce relatively large batches of ice cream, typically ranging from 1.0 liter to 2.0 liters or more, in a time period of approximately 20-60 minutes. In addition, most current domestic ice cream makers also require that the containers (within which the ice cream will be produced) be "frozen" before making the ice cream, i.e., the container must be placed in a freezer for approximately 4-8 hours before use. Thus, there is a substantial delay between the time that the making of the ice cream commences and the time that the batch of ice cream is completed. Furthermore, even after the batch of ice cream has been completed, it is still necessary to manually remove the ice cream from the ice cream maker, and then it is also necessary to scoop out single servings of the ice cream into a separate container (e.g., a bowl, a cone, etc.) for consumption.

Thus there is a need for a new system for providing a single serving of a frozen confection, in a reduced period of time, and which is dispensed directly into the container (e.g., a bowl, a cone, etc.) from which it will be consumed.

In addition, it would also be desirable for the same system to be capable of providing a single serving of a cold beverage, and/or a single serving of a hot beverage.

SUMMARY

The present invention comprises the provision and use of a novel system for providing a single serving of a frozen confection, in a reduced period of time, and which is dispensed directly into the container (e.g., a bowl, a cone, etc.) from which it will be consumed.

In addition, the same system is also capable of providing a single serving of a cold beverage, and/or a single serving of a hot beverage.

In one preferred form of the invention, there is provided a pod for providing a single serving of an ingestible substance, the pod comprising:

a base having an outer perimeter and an inner opening;
an outer hollow tube mounted at the outer perimeter of the base;
an inner hollow tube mounted at the inner opening of the base;
wherein the base, the outer hollow tube and the inner hollow tube together define a recess;
at least one ingredient for forming a single serving of the ingestible substance, the at least one ingredient being disposed within the recess; and
a cap having an outer perimeter and an inner opening, the outer perimeter of the cap being slightly smaller than the diameter of the outer hollow tube and the inner opening of the cap being slightly larger than the diameter of the inner hollow tube, such that the cap can be advanced within the recess toward the base.

In another preferred form of the invention, there is provided a pod for providing a single serving of a frozen confection, the pod comprising:

a container having a recess;
at least one scraper paddle movably disposed within the recess;
at least one ingredient for forming a single serving of the frozen confection, the at least one ingredient being disposed within the recess of the container; and
a cap movable into the recess of the container.

In another preferred form of the invention, there is provided a pod for providing a single serving of a frozen confection, the pod comprising:

a substantially rigid container having a recess;
at least one ingredient for forming a single serving of the frozen confection, the at least one ingredient being disposed within the recess of the container; and
a cap movable into the recess of the container.

In another preferred form of the invention, there is provided apparatus for providing a single serving of an ingestible substance, the apparatus comprising:

a nest for receiving a pod containing at least one ingredient for forming a single serving of the ingestible substance, wherein the nest comprises an annular recess for receiving a pod having an annular configuration;
a cooling unit for cooling the pod;
a water supply for introducing water into the pod; and
an air supply for introducing air into the pod.

In another preferred form of the invention, there is provided apparatus for providing a single serving of a ingestible substance, the apparatus comprising:

a nest for receiving a pod containing at least one ingredient for forming a single serving of the ingestible substance, wherein the pod comprises at least one internal paddle;
a cooling unit for cooling the pod;
a water supply for introducing water into the pod; and
a rotation unit for rotating the at least one internal paddle of the pod.

In another preferred form of the invention, there is provided apparatus for providing a single serving of an ingestible substance, the apparatus comprising:

a nest for receiving a pod containing at least one ingredient for forming a single serving of the ingestible substance;
a heat transfer unit for transferring heat between the pod and the nest, wherein the heat transfer unit is capable of (i) taking heat out of the pod, and (ii) supplying heat to the pod; and
a water supply for introducing water into the pod.

In another preferred form of the invention, there is provided a method for providing a single serving of a frozen confection, the method comprising:

providing a pod comprising at least one ingredient for providing a single serving of a frozen confection;
cooling the pod;

introducing water into the pod;

simultaneously stirring the contents of the pod while scraping at least one wall of the pod to prevent a build-up of the frozen confection on the at least one wall of the pod; and ejecting the frozen confection out of the pod.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 13 and 14 are schematic views showing further details of (i) the lid assembly of the system shown in FIGS. 1-6, (ii) portions of the cold water and air delivery assembly of the system shown in FIGS. 1-6, and (iii) the control electronics of the system shown in FIGS. 1-6;

DETAILED DESCRIPTION OF THE PREFERRED EMBODIMENTS

Figure 1:
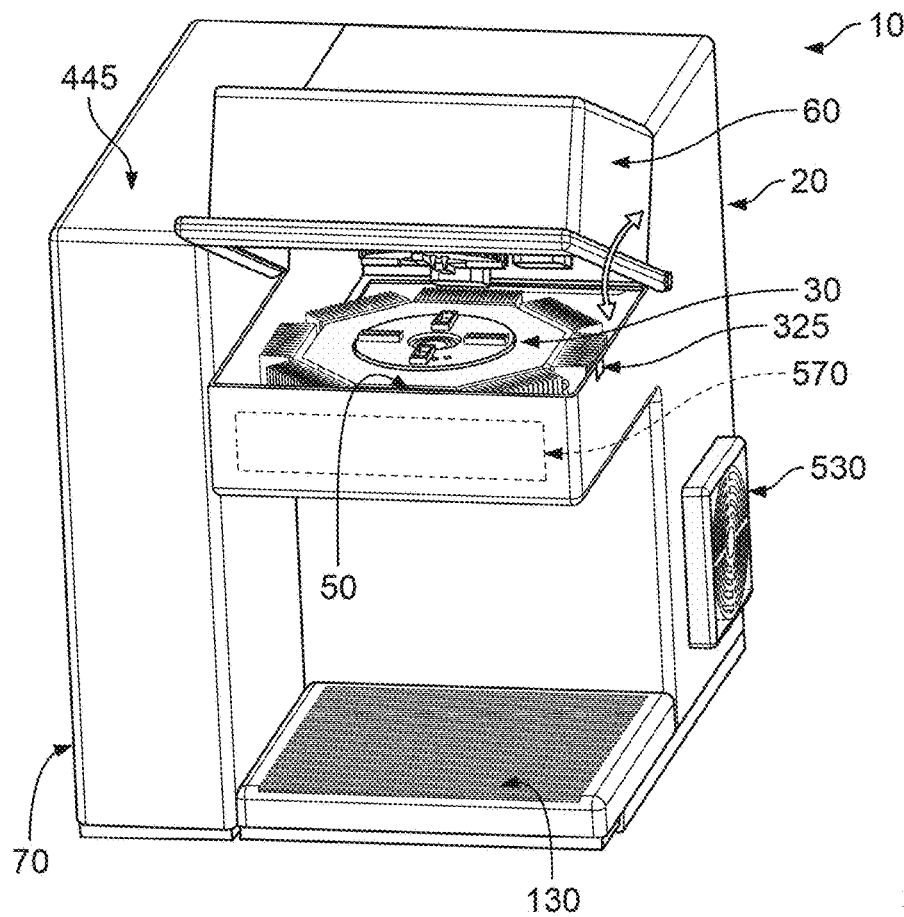
FIGS. 1-6 are schematic views showing a novel system for providing a single serving of a frozen confection, wherein all of the components of the system are shown in FIGS. 1-3 as being opaque and wherein some of the components of the system are shown in FIGS. 4-6 as being transparent.
Figure 2:
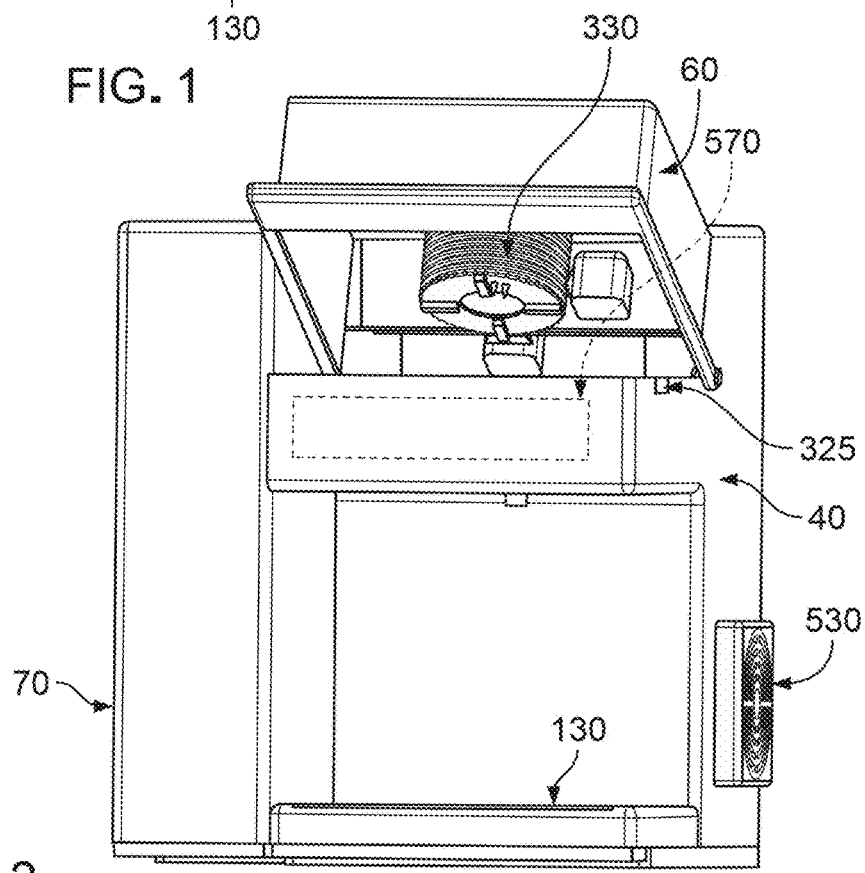
Figure 3:
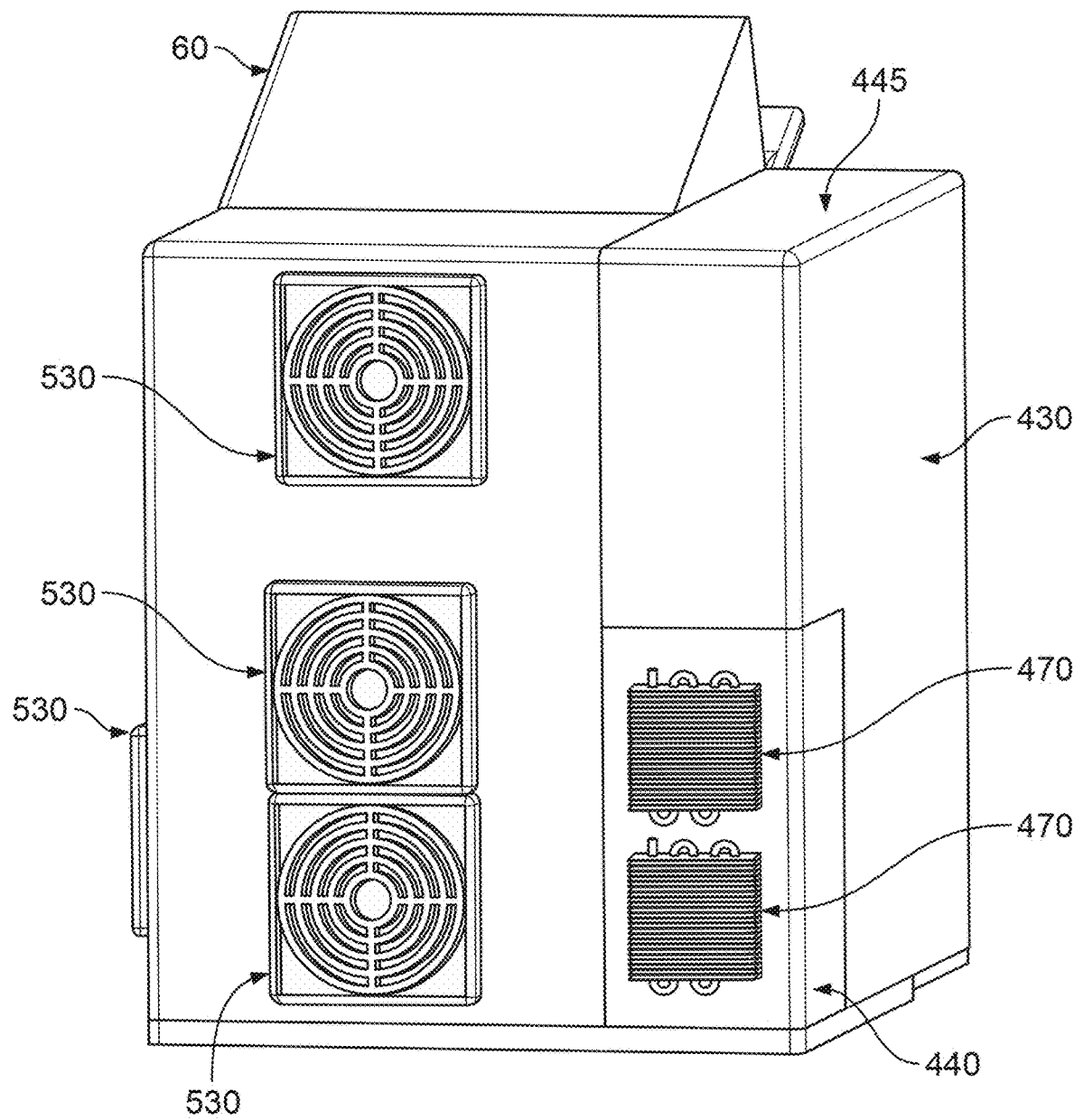
Figure 4:
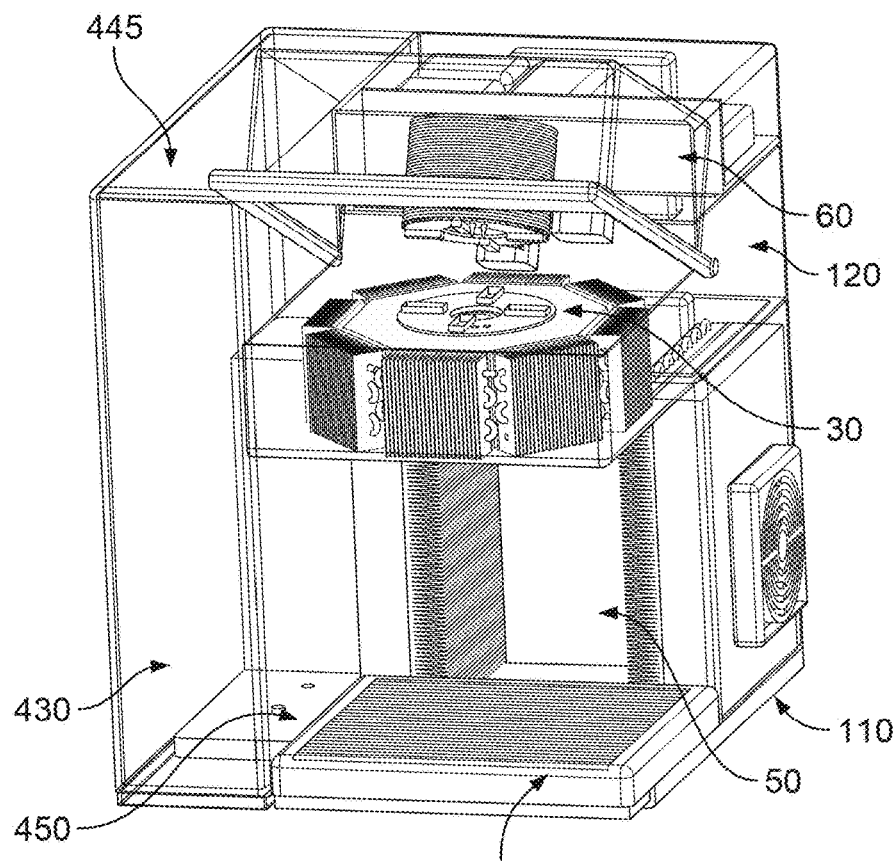
Figure 5:
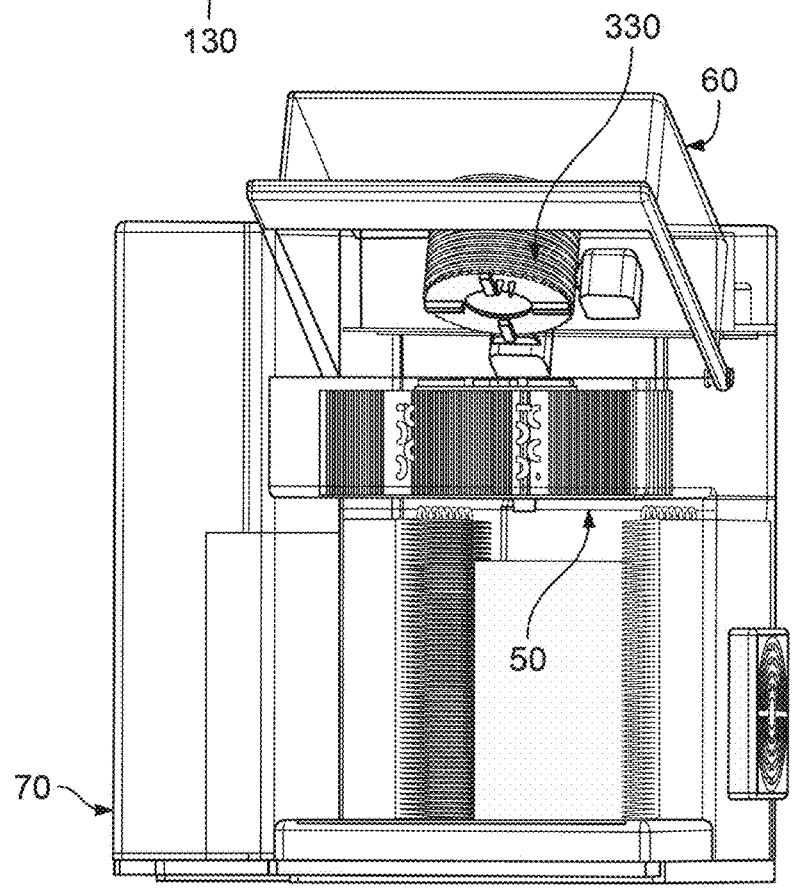

The present invention comprises the provision and use of a novel system for providing a single serving of a frozen confection, in a reduced period of time, and which is dispensed directly into the container (e.g., a bowl, a cone, etc.) from which it will be consumed.

In addition, the same system is also capable of providing a single serving of a cold beverage, and/or a single serving of a hot beverage.

The System in General

In one preferred form of the invention, and looking first at FIGS. 1-6, there is provided a novel system 10 for providing a single serving of a frozen confection (e.g., ice cream, frozen yogurt, a smoothie, etc.). System 10 is also capable of providing a single serving of a cold beverage, and/or a single serving of a hot beverage.

For clarity of explanation, system 10 will first be described in the context of providing a single serving of a frozen confection; then system 10 will be described in the context of providing a single serving of a cold beverage; and then system 10 will be described in the context of providing a single serving of a hot beverage.

System 10 generally comprises a machine 20 and a pod 30, wherein machine 20 is configured to, among other things, receive a pod 30 containing a supply of ingredients for forming a single serving of the frozen confection, cool pod 30 (and its contents), introduce cold water and air into pod 30, agitate the contents of pod 30 so as to form the frozen confection, and then eject the frozen confection from pod 30 directly into the container (e.g., a bowl, a cone, etc.) from which it will be consumed.

The Machine

Machine 20 is configured to, among other things, receive a pod 30 containing a supply of ingredients for forming a single serving of the frozen confection, cool pod 30 (and its contents), introduce cold water and air into pod 30, agitate the contents of pod 30 so as to form the frozen confection, and then eject the frozen confection from pod 30 directly into the container (e.g., a bowl, a cone, etc.) from which it will be consumed.

To this end, machine 20 is a reusable device which generally comprises a housing 40, a nest assembly 50, a lid assembly 60, a water supply 70, a cold water and air delivery assembly 80, a heat dissipation assembly 90 and control electronics 100.

Housing 40 is shown in FIGS. 1-6. Housing 40 generally comprises a base 110, a cover 120 mounted to base 110, and a tray 130 mounted to base 110. Cover 120 serves to enclose interior components of machine 20 and to support other components of machine 20. Tray 130 serves to receive a container (e.g., a bowl) into which the frozen confection is to be ejected and from which the frozen confection is to be consumed (alternatively, where the frozen confection is to be consumed from a cone, the cone is held above tray 130).

Nest assembly 50 is shown in further detail in FIGS. 7-12. Nest assembly 50 serves to receive a pod 30 containing a supply of ingredients for forming a single serving of the frozen confection and, among other things, rapidly cool pod 30 (and its contents) so as to provide a single serving of a frozen confection in a reduced period of time. To this end, and as will hereinafter be discussed, nest assembly 50 and pod 30 are each provided with a unique configuration and a unique construction so as to speed up cooling of pod 30.

More particularly, nest assembly 50 generally comprises a nest 140 having a top surface 150, a bottom surface 160 and a plurality of outer faces 170. In one preferred form of the invention, nest 140 has eight outer faces 170, so that nest 140 has a generally octagonal configuration. Alternatively, nest 140 may have a different number of outer faces 170. Nest 140 is preferably formed out of a high heat-transfer material such as aluminum.

Nest 140 also comprises a bore 180 and a counterbore 190. A hollow cylinder 200 is disposed in bore 180 and extends upward into counterbore 190. As a result of this construction, an annular recess 210 (i.e., a toroidal recess 210) is formed in top surface 150 of nest 140. Annular recess 210 is generally characterized by an outer wall 220 (which is defined by the aforementioned counterbore 190) and an inner wall 230 (which is defined by the aforementioned hollow cylinder 200). Annular recess 210 is sized to receive pod 30 therein as will hereinafter be discussed.

Nest 140 also comprises a bore 232 which opens on bottom surface 160 of nest 140 and communicates with the interior of annular recess 210. An exit nozzle 233 is mounted to bottom surface 160 of nest 140 at bore 232 so that exit port 234 of exit nozzle 233 communicates with the interior of annular recess 210. A pod sensor 235 is provided in nest 140 to detect when a pod 30 is disposed in annular recess 210 of nest 140.

Figure 7:
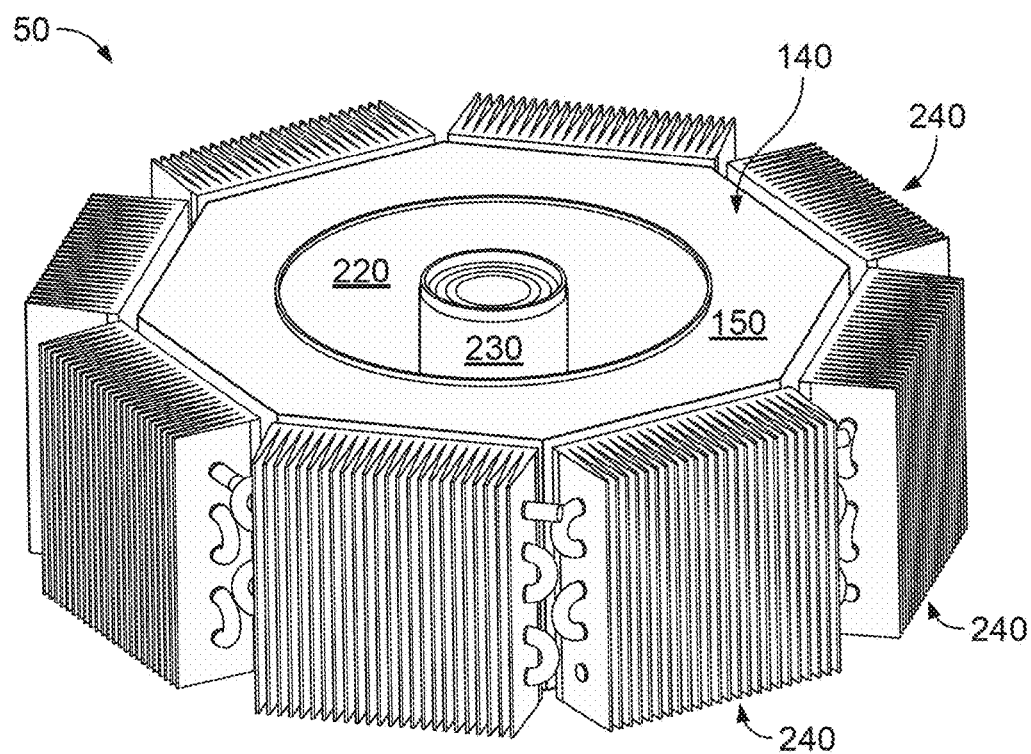
FIGS. 7-12 are schematic views showing further details of the nest assembly of the system shown in FIGS. 1-6.
Figure 8:
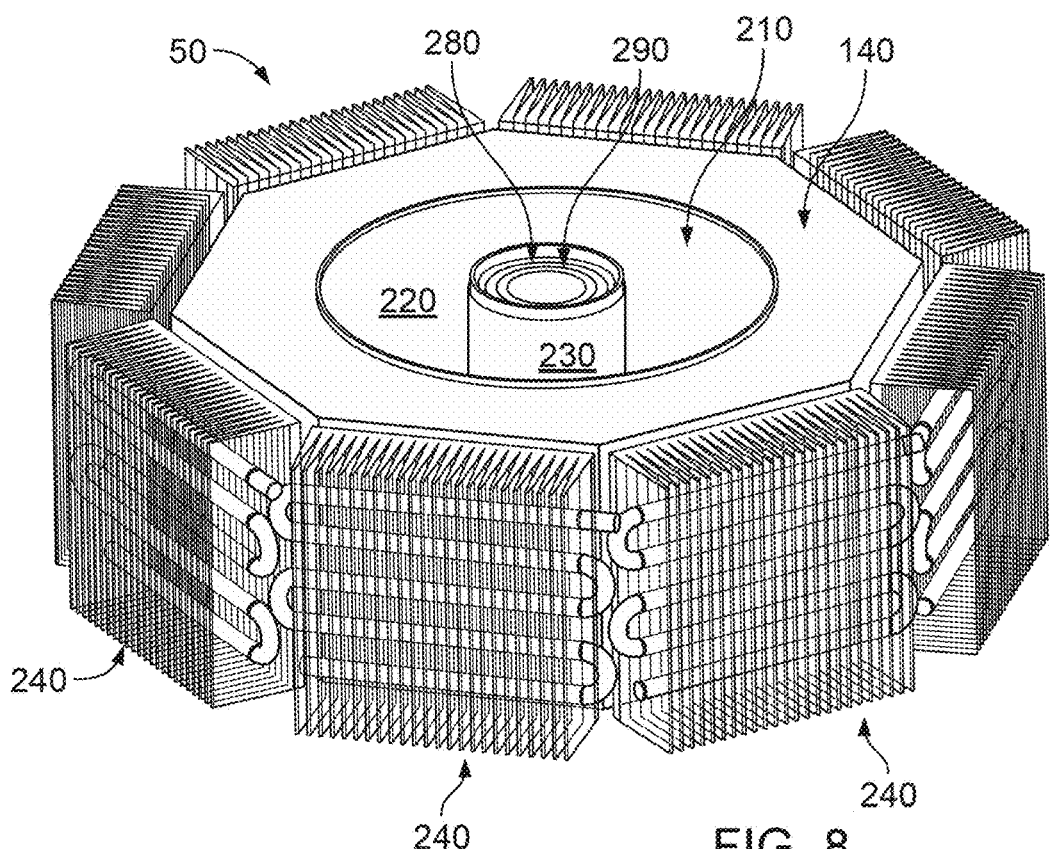
Figure 10:
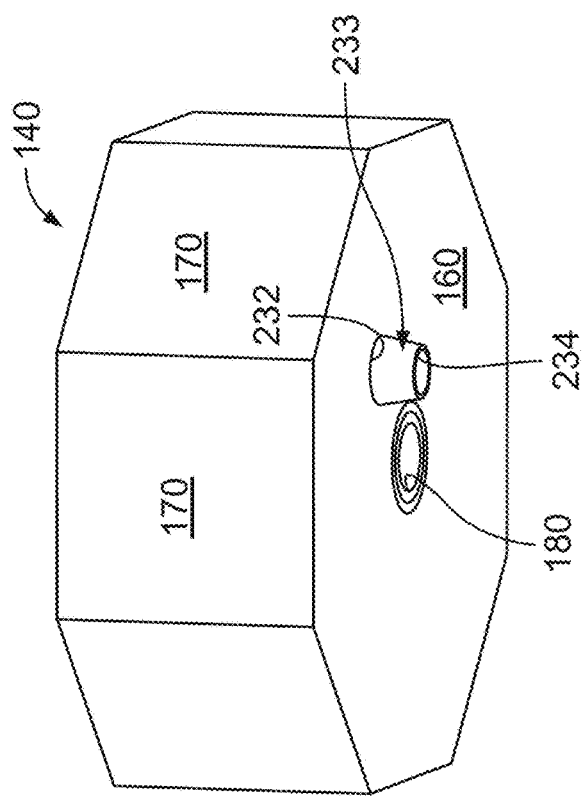
Figure 9:
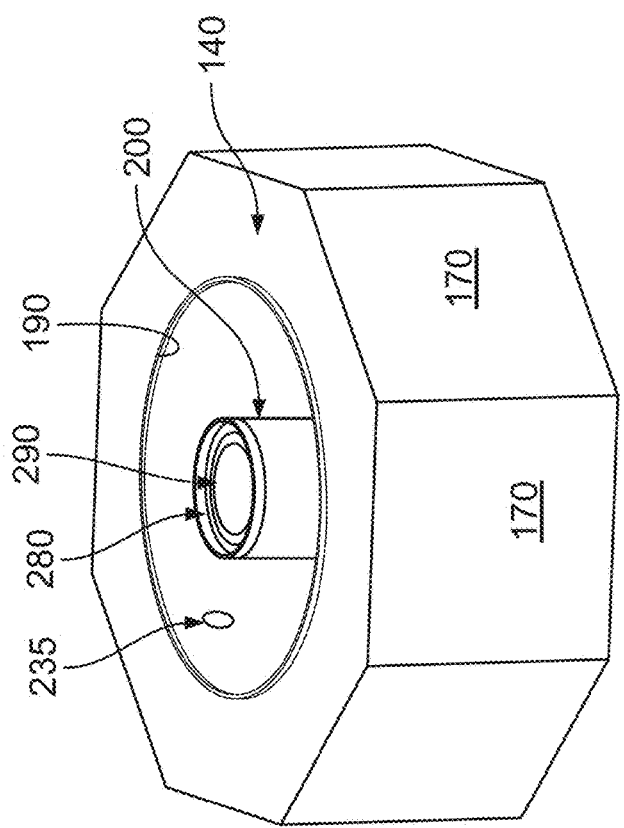
Figure 11:
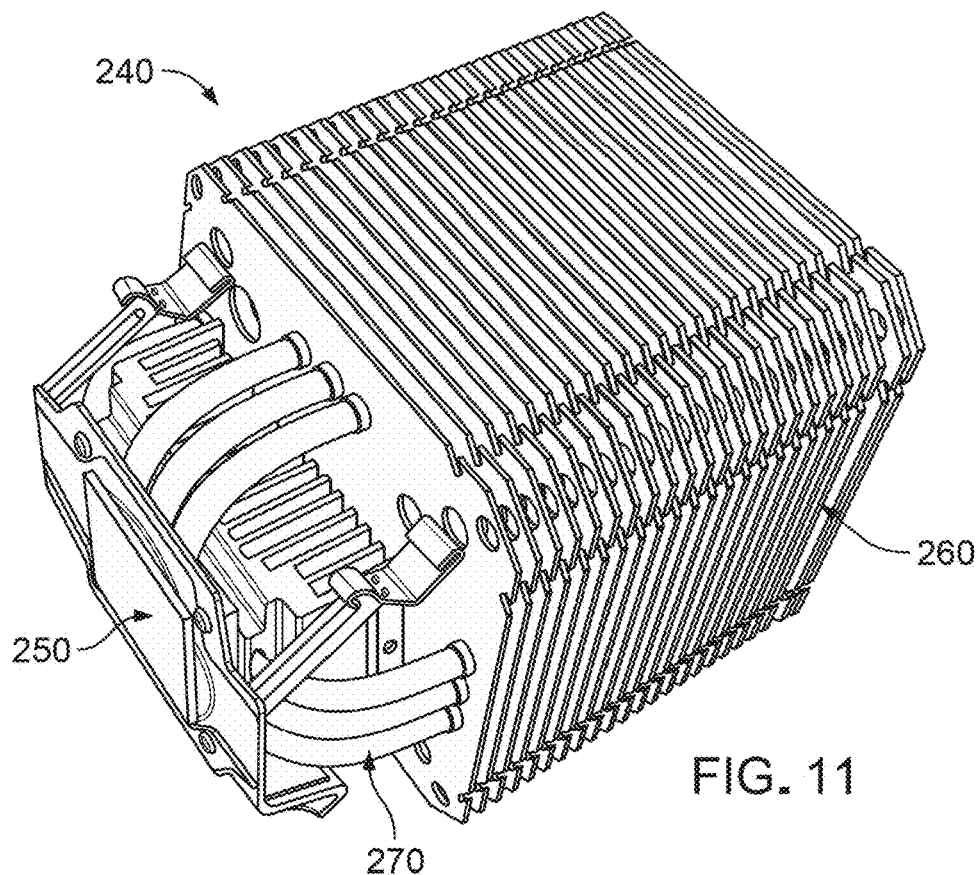

Nest assembly 50 also comprises a plurality of thermoelectric (TEC) assemblies 240. TEC assemblies 240 each comprise a thermoelectric cooler (TEC) element 250, a heat sink 260 and a plurality of heat pipes 270 extending between TEC element 250 and heat sink 260 so as to transfer heat from TEC element 250 to heat sink 260. If desired, multiple TEC elements 250 can be stacked on each heat sink 260 so as to achieve higher temperature differences than can be had with single-stage TEC elements 250. As seen in FIGS. 7, 8 and 11, TEC assemblies 240 are positioned against outer faces 170 of nest 140 so that TEC elements 250 can provide cold or heat to outer faces 170 of nest 140, depending on the direction of the electric current flow supplied to TEC elements 250, whereby to provide cold or heat to outer wall 220 of annular recess 210 of nest 140 (and hence to provide cold or heat to a pod 30 disposed in annular recess 210 of nest 140). It will be appreciated that when machine 20 is to be used to provide a frozen confection, the direction of the electric current flow supplied to TEC elements 250 causes cold to be applied to outer faces 170 of nest 140.

Figure 12:
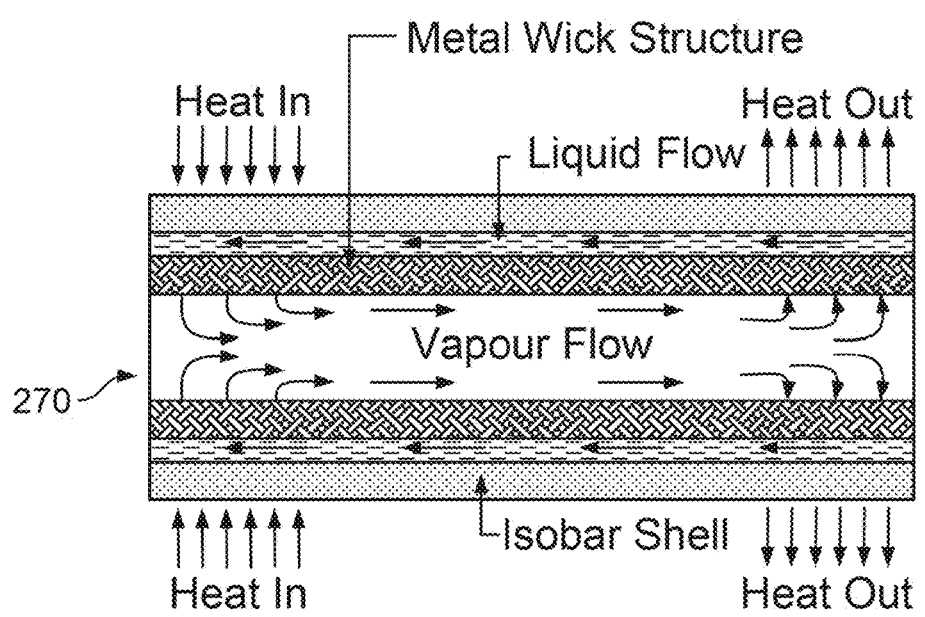

Heat pipes 270 are preferably of the sort shown in FIG. 12, i.e., they provide a high heat-transfer capacity for transferring heat from TEC elements 250 to heat sinks 260. Heat pipes 270 are preferably also connected to heat dissipation assembly 90 so as to carry the heat collected by heat pipes 270 to heat dissipation assembly 90 for further dissipation to the environment.

Nest assembly 50 also comprises a cylindrical TEC 280 for providing cold to inner wall 230 of annular recess 210, and a cylindrical TEC 290 for supplying heat to inner wall 230 of annular recess 210.

Lid assembly 60 is shown in further detail in FIGS. 13 and 14. Lid assembly 60 generally comprises a handle 300 to which is mounted a lid 310, such that lid 310 moves in conjunction with handle 300. Handle 300 is pivotally mounted to cover 120 of housing 40 via a pivot pin 320. As a result of this construction, lid assembly 60 can pivot towards or away from nest assembly 50 (see FIG. 1). A lid sensor 325 (FIGS. 1 and 2) is provided for detecting when lid 310 is in its closed position.

Lid assembly 60 comprises a plunger 330 which is movably mounted to lid 310. More particularly, plunger 330 comprises a circumferential gear 340 and a longitudinal gear 350, and lid assembly 60 comprises a rotation motor 360 for driving a rotation gear 370 and a vertical motor 380 for driving a vertical gear 390, with rotation gear 370 of rotation motor 360 engaging circumferential gear 340 of plunger 330, and with vertical gear 390 of vertical motor 380 engaging longitudinal gear 350 of plunger 330. As a result of this construction, rotation motor 360 can cause plunger 330 to rotate within lid 310, and vertical motor 380 can cause plunger 330 to move vertically within lid 310.

Plunger 330 further comprises a plurality of fingers 400 for engaging counterpart fingers on pod 30 (see below), and a pair of hollow fangs 410, 420 for penetrating the top of pod 30 and delivering additional ingredients into pod 30 (see below).

Looking next at FIGS. 1-6, water supply 70 generally comprises an ambient-temperature water tank 430 and a cold water tank 440. In one preferred form of the invention, ambient-temperature water tank 430 may hold approximately 2.0 liters of water, and cold water tank 440 may hold approximately 0.5 liter of water. Ambient-temperature water tank 430 comprises a removable cover 445 to enable ambient-temperature water tank 430 to be filled with water. A line (not shown) is provided for moving water from ambient-temperature water tank 430 to cold water tank 440. A water sensor 450 (FIG. 4) is provided for monitoring for the presence of water in ambient-temperature water tank 430, and a water temperature sensor 460 (FIG. 6) is provided for monitoring the temperature of the water in cold water tank 440. A plurality of TEC assemblies 470, each preferably similar to the aforementioned TEC assemblies 240, are provided for chilling the water in cold water tank 440, i.e., TEC assemblies 470 comprise TEC elements 473, heat sinks 475 and heat pipes 477. Heat pipes 477 of TEC assemblies 470 are preferably connected to heat dissipation assembly 90 so as to carry the heat produced by TEC assemblies 470 to heat dissipation assembly 90.

Figure 6:
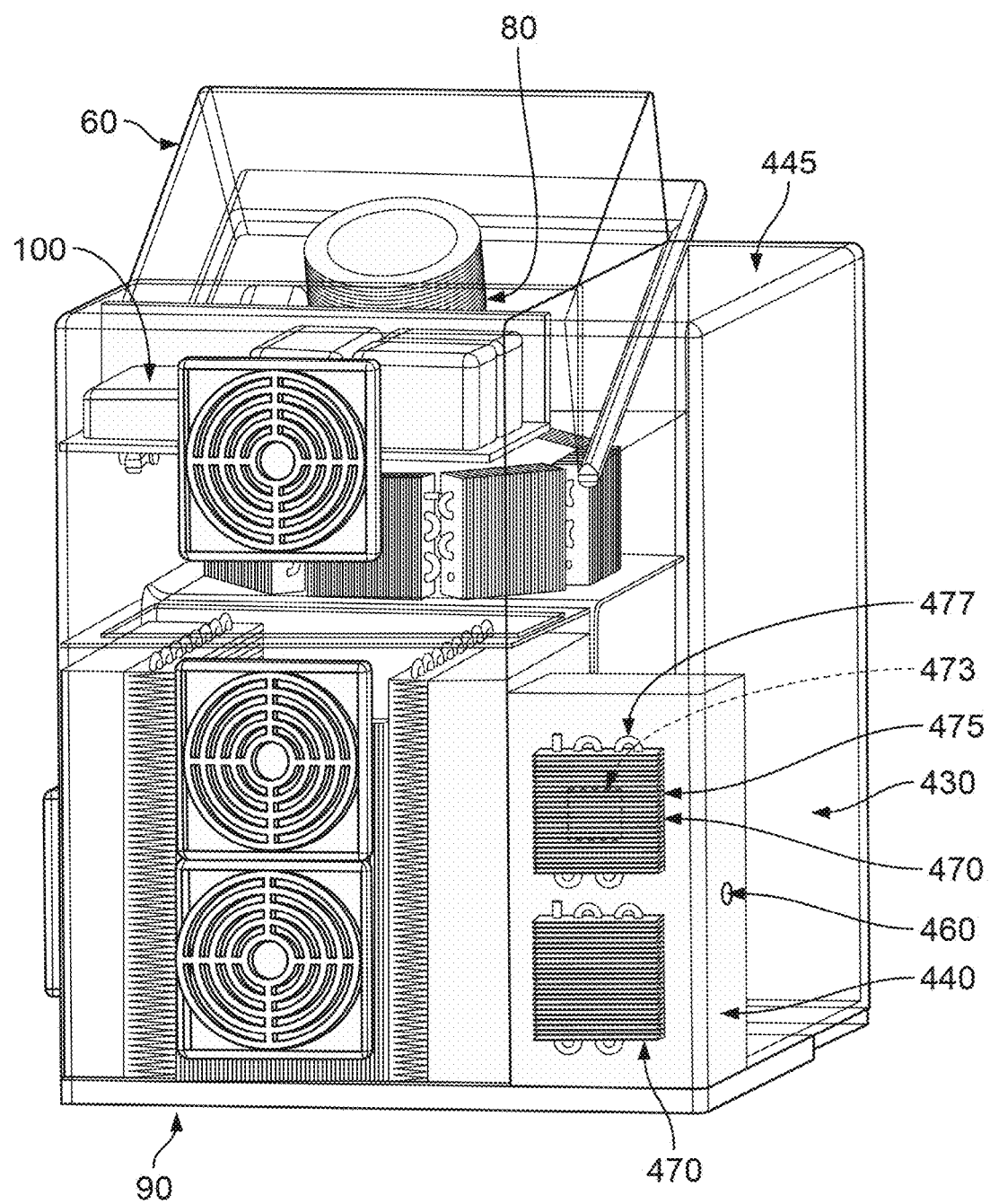

Looking next at FIGS. 6 and 14, cold water and air delivery assembly 80 generally comprises a water pump 480 which pumps cold water from cold water tank 440 into hollow fang 410 of plunger 330, and an air pump 490 which pumps air into hollow fang 420 of plunger 330. In one preferred form of the invention, hollow fang 410 comprises a spray nozzle for injecting droplets of atomized water into pod 30 (see below), whereby to facilitate the formation of the frozen confection (see below). Such spray nozzles are well known in the art of liquid dispersion. Cold water and air delivery assembly 80 also comprises various fluid lines (not shown) for transferring water from cold water tank 440 to hollow fang 410 of plunger 330 and for introducing air into hollow fang 420 of plunger 330.

Figure 15:
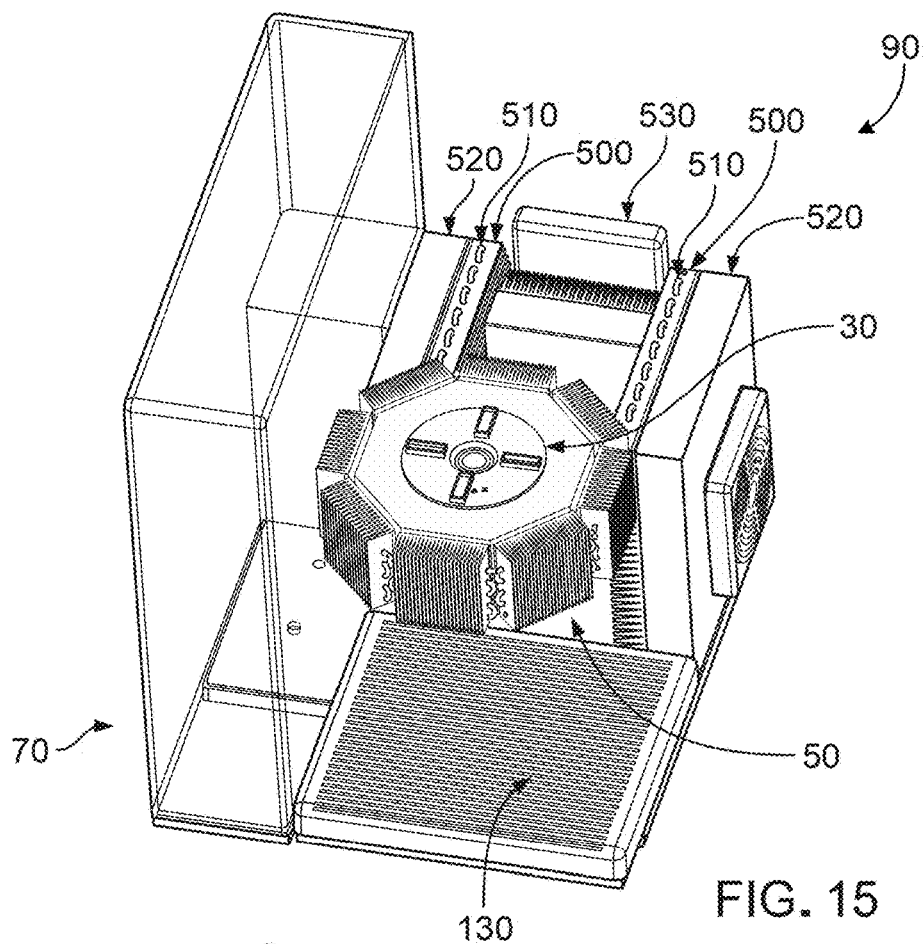
FIGS. 15 and 16 are schematic views showing, among other things, further details of the heat dissipation assembly of the system shown in FIGS. 1-6.
Figure 16:
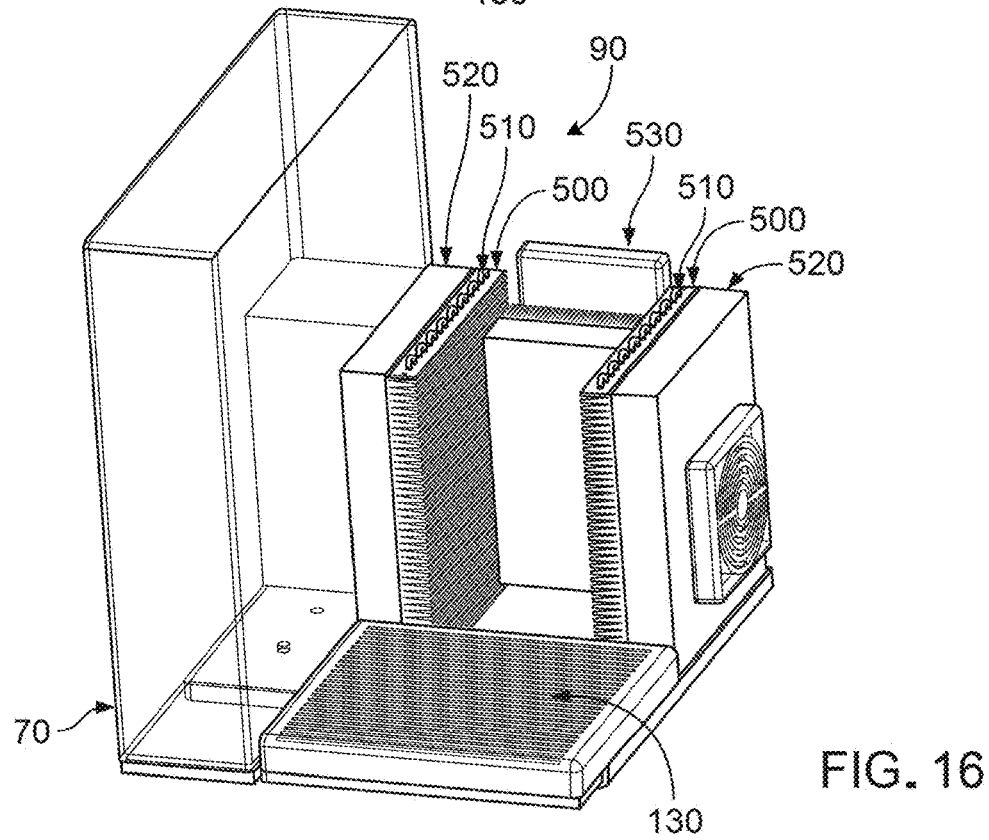

Heat dissipation assembly 90 is shown in further detail in FIGS. 15 and 16. Heat dissipation assembly 90 dissipates heat received from heat pipes 270 of TEC assemblies 240 of nest 140 and dissipates heat received from the heat pipes 477 of TEC assemblies 470 of cold water tank 440. Heat dissipation assembly 90 generally comprises a plurality of heat sinks 500 which draw heat from heat pipes 510 (which are connected to heat pipes 270 of TEC assemblies 240 of nest 140 and heat pipes 477 of TEC assemblies 470 of cold water tank 440), a plurality of condensers 520 for receiving heat from heat sinks 500, and a plurality of fans 530 for cooling condensers 520.

Figure 17:
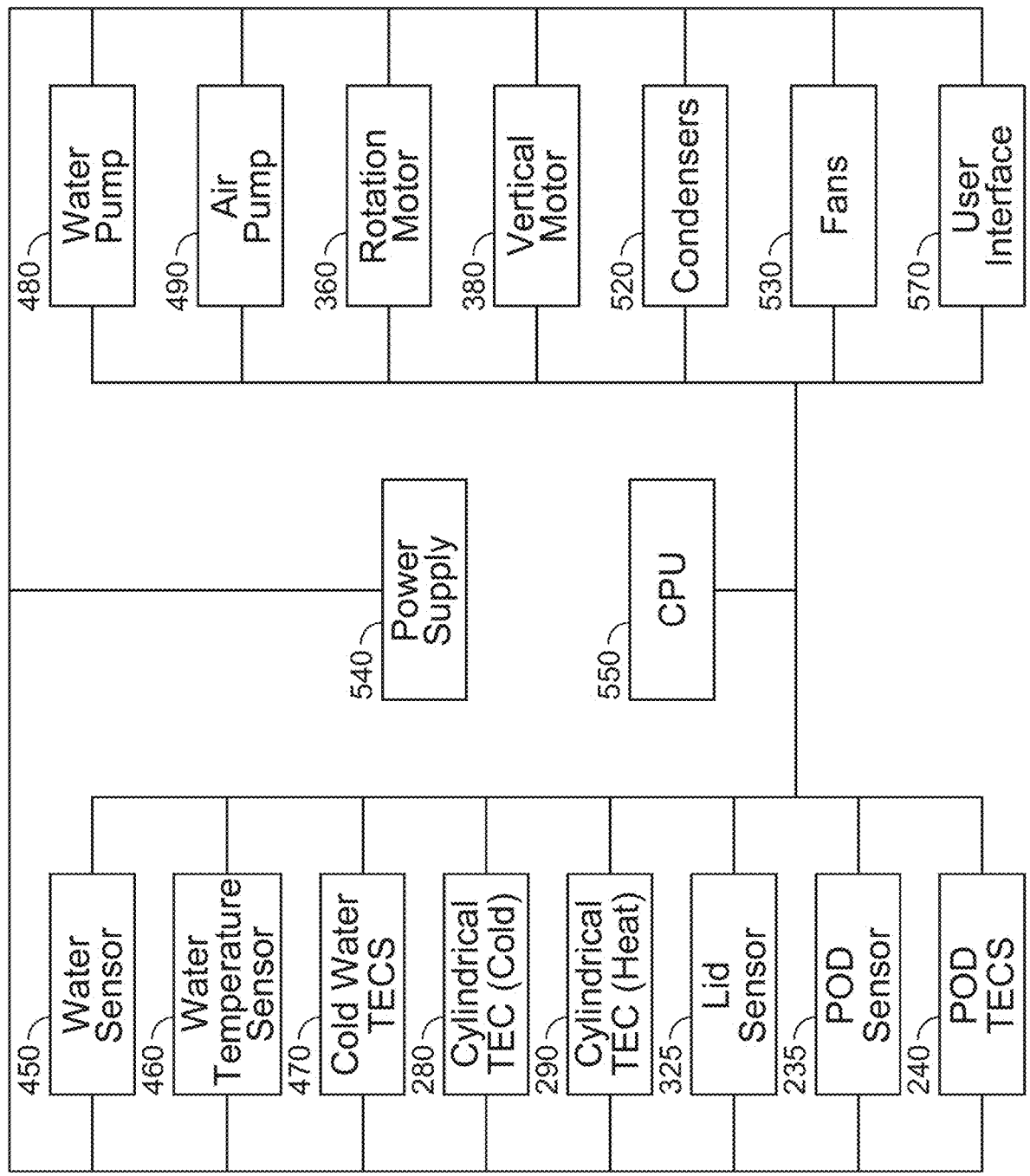
FIG. 17 is a schematic view showing further details of the control electronics of the system shown in FIGS. 1-6.

Control electronics 100 generally comprise a power supply 540 (FIG. 14), a central processing unit (CPU) 550 and a user interface 570 (FIG. 2), e.g., a display screen, operating buttons, etc. As seen in FIG. 17, power supply 540 and CPU 550 are connected to the aforementioned water sensor 450, water temperature sensor 460, TEC assemblies 470, cylindrical TEC 280, cylindrical TEC 290, lid sensor 325, pod sensor 235, TEC assemblies 240, water pump 480, air pump 490, rotation motor 360, vertical motor 380, condensers 520, fans 530 and user interface 570. CPU 550 is appropriately programmed to operate machine 20 in response to instructions received from user interface 570 as will hereinafter be discussed.

It will be appreciated that machine 20 is preferably configured to operate at a maximum load of 1800 watts, which is generally the maximum load that standard outlets in a kitchen can handle.

The Pod

Pod 30 contains a supply of ingredients for providing a single serving of a frozen confection (e.g., ice cream, frozen yogurt, a smoothie, etc.). In the preferred form of the invention, pod 30 is provided as a single-use, disposable pod, i.e., a new pod 30 is used for each serving of the frozen confection.

As noted above, and as will hereinafter be discussed, pod 30 is provided with a unique configuration and a unique construction so as to speed up cooling of pod 30 (and its contents), whereby to speed up the process of producing the frozen confection.

Figure 18:
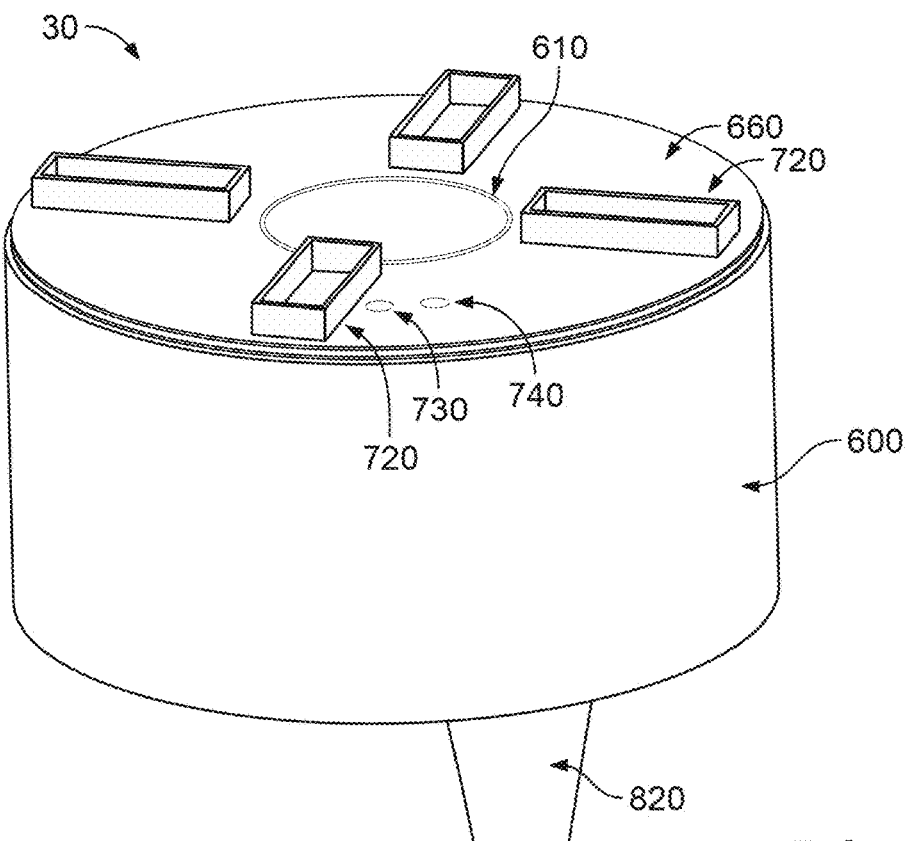
FIGS. 18-20 are schematic views showing further details of the pod of the system shown in FIGS. 1-6.
Figure 19:
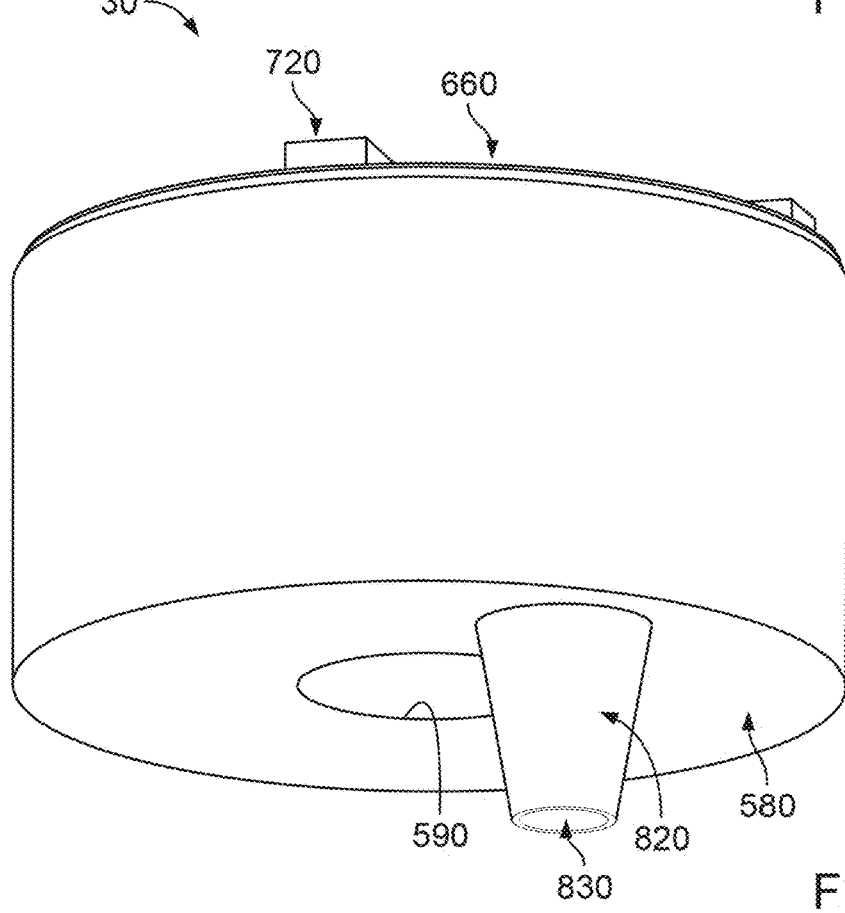
Figure 20:
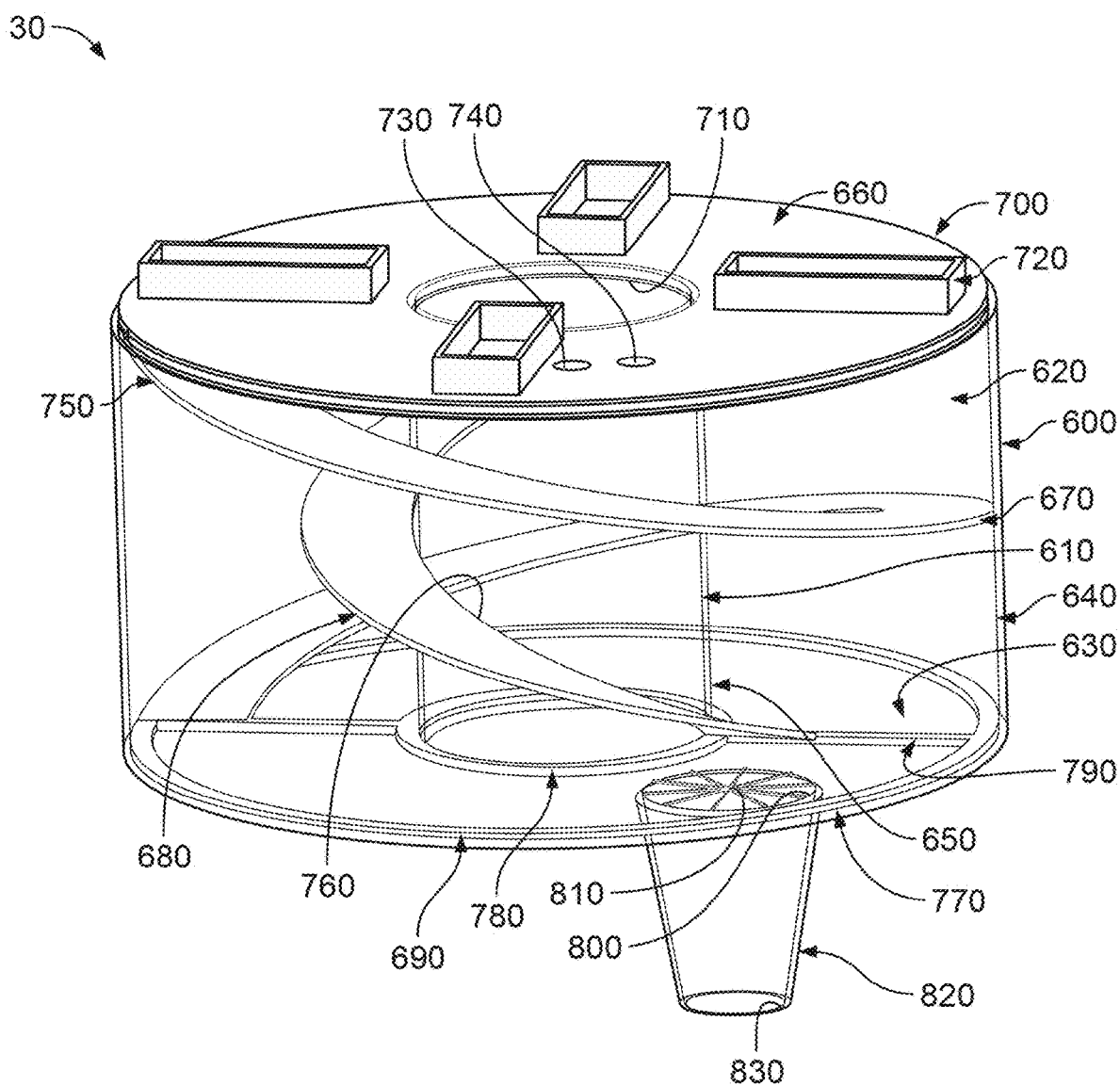

More particularly, and looking now at FIGS. 18-20, pod 30 generally comprises a base 580 having an opening 590 formed therein. An outer hollow tube 600 rises upward from the outer perimeter of base 580, and an inner hollow tube 610 is disposed in opening 590 of base 580 and rises upward from the inner perimeter of base 580. As a result of this construction, an annular recess 620 (i.e., a toroidal recess 620) is formed between base 580, outer hollow tube 600 and inner hollow tube 610, with annular recess 620 being generally characterized by a floor 630 (defined by base 580), an outer wall 640 (defined by outer hollow tube 600) and an inner wall 650 (defined by inner hollow tube 610). Note that the diameter of outer hollow tube 600 of pod 30 is slightly less than the diameter of counterbore 190 of nest 140, and the diameter of inner hollow tube 610 of pod 30 is slightly greater than the diameter of hollow cylinder 200 of nest assembly 50, such that pod 30 can be seated in annular recess 210 of nest 140, with outer hollow tube 600 of pod 30 making a close sliding fit with outer wall 220 of nest 140 and with inner hollow tube 610 of pod 30 making a close sliding fit with inner wall 230 of nest assembly 50.

Preferably base 580 of pod 30 comprises a high heat-transfer material (e.g., aluminum, a molded polymer, etc.), outer hollow tube 600 of pod 30 comprises a high heat-transfer material (e.g., aluminum, a molded polymer, etc.) and inner hollow tube 610 of pod 30 comprises a high heat-transfer material (e.g., aluminum, a molded polymer, etc.). In one preferred form of the invention, base 580, outer hollow tube 600 and inner hollow tube 610 comprise a plastic/thin metallic film composite (i.e., a body of plastic having an external covering of a thin metallic film). It should be appreciated that the plastic/thin metallic film composite allows for improved thermal transfer and helps preserve the contents of pod 30, while also providing pod 30 with a unique packaging appearance. Preferably base 580, outer hollow tube 600 and inner hollow tube 610 are substantially rigid.

Thus it will be seen that, due to the unique configurations and unique constructions of nest assembly 50 and pod 30, when a pod 30 is disposed in the annular recess 210 of nest 140, cold can be efficiently applied to outer wall 640 of pod 30 by outer wall 220 of nest 140, cold can be efficiently applied to inner wall 650 of pod 30 by inner wall 230 of nest assembly 50, and cold can be efficiently applied to base 580 of pod 30 by the floor of annular recess 210 of nest 140. As a result, machine 20 can rapidly cool pod 30 (and its contents) so as to provide a single serving of a frozen confection in a reduced period of time.

Pod 30 also comprises a cap 660, an outer helical scraper paddle 670, an inner helical scraper paddle 680, and a bottom scraper paddle 690.

Cap 660 has an outer edge 700 which is sized slightly smaller than the diameter of outer wall 640 of pod 30, and cap 660 has an inner hole 710 which has a diameter slightly larger than inner hollow tube 610 of pod 30, such that cap 660 can move longitudinally into, and then along, annular recess 620 of pod 30 (see below). Cap 660 is preferably substantially rigid.

Cap 660 also comprises fingers 720 for engaging counterpart fingers 400 of plunger 330, whereby rotational and longitudinal motion can be imparted to cap 660 of pod 30 by plunger 330, as will hereinafter be discussed. Cap 660 also comprises two weakened portions 730, 740 for penetration by hollow fangs 410, 420, respectively, of plunger 330, as will hereinafter be discussed in further detail.

Outer helical scraper paddle 670 extends between cap 660 and bottom scraper paddle 690, and comprises an outer edge 750 which makes a close sliding fit with outer wall 640 of annular recess 620. Inner helical scraper paddle 680 extends between cap 660 and bottom scraper paddle 690, and comprises an inner edge 760 which makes a close sliding fit with inner hollow tube 610 of pod 30. Bottom scraper paddle 690 comprises an outer ring 770 which contacts base 580 and makes a close sliding fit with outer wall 640 of annular recess 620, an inner ring 780 which contacts base 580 and makes a close sliding fit with inner hollow tube 610 of pod 30, and a pair of struts 790 which contact base 580 and extend between outer ring 770 and inner ring 780. As a result of this construction, fingers 720 may be used to turn cap 660 rotationally, such that outer helical scraper paddle 670 rotates, scrapping the interior surface of outer wall 640 of pod 30, inner helical scraper paddle 680 rotates, scraping the exterior surface of inner hollow tube 610, and struts 770 rotate, scraping floor 630 of base 580. It will be appreciated that the provision of outer helical scraper paddle 670, inner helical scraper paddle 680 and bottom scraper paddle 690 is highly advantageous, since outer helical scraper paddle 670, inner helical scraper paddle 680 and bottom scraper paddle 690 can simultaneously (i) agitate the contents of pod 30 so as to ensure uniform and rapid formation of the frozen confection, and (ii) prevent the build-up of frozen confection on base 580, outer hollow tube 600 and inner hollow tube 610, which could inhibit cooling of the contents of pod 30.

Outer helical scraper paddle 670 and inner helical scraper paddle 680 are configured and constructed so that they may be longitudinally compressed by applying a longitudinal force to cap 660, whereby to move cap 660 into, and along, annular recess 620 of pod 30, so as to bring cap 660 substantially into engagement with base 580 (see below). In one preferred form of the invention, outer helical scraper paddle 670 and inner helical scraper paddle 680 are made out of spring steel, with outer helical scrapper paddle 670 and inner helical scraper paddle 680 compressing to substantially flat configurations when a longitudinal force drives cap 660 against base 580 (or, more precisely, substantially against base 580, since the flattened outer helical scraper paddle 670 and the flattened inner helical scraper paddle 680 will be disposed between, and slightly separate, cap 660 from base 580). Bottom scraper paddle 690 may also be formed out of spring steel. In another preferred form of the invention, outer helical scraper paddle 670 and/or inner helical scraper paddle 680 (and/or bottom scraper paddle 690) may be made out of a plastic. If desired, outer helical scraper paddle 670 and/or inner helical scraper paddle 680 (and/or bottom scraper paddle 690) may comprise a shape memory material (e.g., Nitinol).

A bore 800 passes through base 580 and communicates with the interior of annular recess 620. A weakened portion 810 normally closes off bore 800 but may be ruptured upon the application of an appropriate force so as to pass material (e.g., frozen confection) therethrough. An exit nozzle 820 is mounted to base 580 adjacent to bore 800 so that exit port 830 of exit nozzle 820 communicates with the interior of annular recess 620 when weakened portion 810 has been ruptured.

Pod 30 generally has a surface area-to-volume ratio which is greater than 2:1, and which is preferably approximately 8:1. It will be appreciated that increasing the surface area of pod 30 increases the speed of forming the frozen confection in pod 30, since it allows heat to be drawn out of pod 30 (and its contents) more quickly. It will also be appreciated that forming pod 30 with a toroidal configuration (i.e., with both interior and exterior access surfaces) provides increased surface area and enables more rapid cooling of pod 30 and its contents, inasmuch as cold may be simultaneously applied to both the outer surfaces of pod 30 and the inner surfaces of pod 30.

By way of example but not limitation, in one preferred form of the invention, pod 30 has an outer diameter of 2.25 inches and a height of 3.75 inches (i.e., outer hollow tube 600 has an outer diameter of 2.25 inches and a height of 3.75 inches), whereby to provide a surface area of 26.49 square inches and a volume of 14.90 cubic inches; and pod 30 has an inner diameter of 1.4 inches and a height of 3.75 inches (i.e., inner hollow tube 610 has an inner diameter of 1.4 inches and a height of 3.75 inches), whereby to provide a surface area of 16.49 square inches and a volume of 5.77 cubic inches; thereby yielding a total pod surface area of 42.98 square inches (i.e., 26.49 square inches+16.49 square inches=42.98 square inches) and a total pod volume of 9.13 cubic inches (i.e., 14.90 cubic inches−5.77 cubic inches=9.13 cubic inches), and a surface area-to-volume ratio of 8.47:1.

Pod 30 contains a fresh supply of ingredients for forming the frozen confection (e.g., ice cream, frozen yogurt, smoothie, etc.). More particularly, pod 30 may contain a frozen confection mix (dry or liquid) containing, for example, sugar and powder crystals, preferably many of which are less than 50 μm in size, and preferably containing at least 0.1% stabilizers by volume. A dry frozen confection mix preferably has at least 50% of its constituents (e.g., the sugar and powder crystals) having a size of 50 μm or less.

Where pod 30 is to produce a single serving of ice cream, in a preferred form of the invention, pod 30 may hold approximately 4-6 ounces of ingredients, and the ingredients may comprise approximately 8% fat (e.g., cream, butter, anhydrous milk fat, vegetable fat, etc.), approximately 1% milk solids-non-fat (MSNF) (e.g., skim milk power (SMP), whole milk powder (WMP), evaporated milk, condensed milk, etc.), approximately 13% sucrose, approximately 0.5% emulsifier and approximately 0.5% stabilizer.

By way of further example but not limitation, if pod 30 contains 1.25 ounces of dry yogurt mix, 5 ounces of frozen yogurt will be formed in pod 30 after running machine 20.

Use of the System

Figure 21:
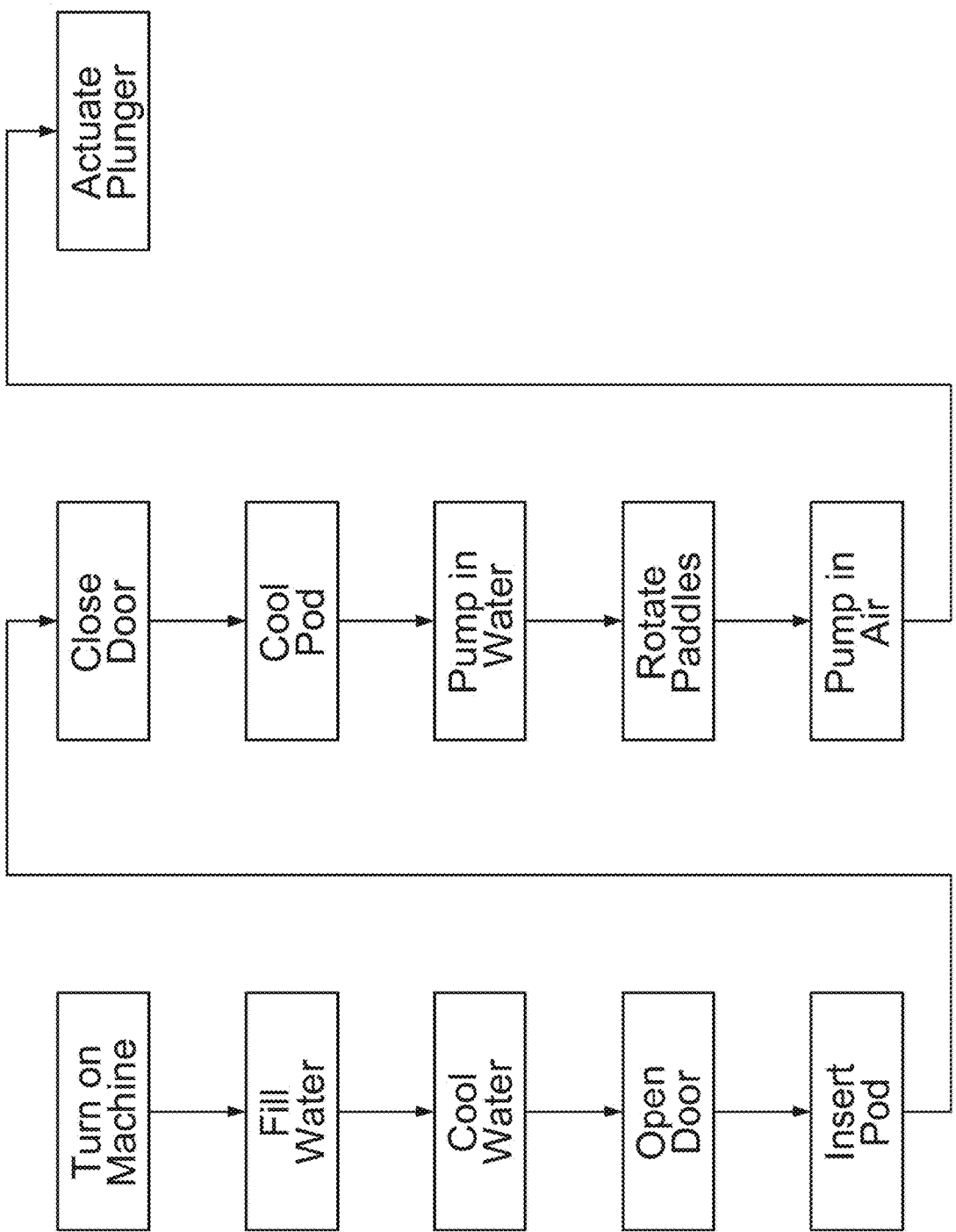
FIG. 21 is a schematic view showing exemplary operation of the system shown in FIGS. 1-6.

Looking now at FIG. 21, machine 20 is prepared for use by introducing water into ambient-temperature water tank 430 and turning on machine 20. Water sensor 450 confirms that there is water in ambient-temperature water tank 430. Machine 20 then pumps water from ambient-temperature water tank 430 into cold water tank 440 and chills the water in cold water tank 440 using TEC assemblies 470. Water temperature sensor 460 monitors the temperature of the water in cold water tank 440. Preferably the water in cold water tank 440 is cooled to between approximately 1-3 degrees C. Machine 20 then sits in this standby condition, re-cooling the water in cold water tank 440 as needed, until a single serving of a frozen confection (e.g., ice cream. frozen yogurt, smoothie, etc.) is to be prepared.

When a single serving of a frozen confection is to be prepared, lid assembly 60 of machine 20 is opened and a fresh pod 30 is positioned in annular recess 210 of nest 140. This is done so that exit nozzle 820 of pod 30 seats in exit nozzle 233 of nest 140. Then lid assembly 60 is closed so that fingers 400 of plunger 330 engage fingers 720 of pod 30, and so that hollow fangs 410, 420 of plunger 330 penetrate the two weakened portions 730, 740 of pod 30. In addition, a container (i.e., the container from which the frozen confection will be consumed) is placed on tray 130 of machine 20, with the container being centered below exit nozzle 233 of nest assembly 50 (alternatively, where the frozen confection is to be consumed from a cone, the cone is held above tray 130).

When pod sensor 235 senses the presence of a pod 30 in annular recess 210 of nest 140, machine 20 cools nest assembly 50 via TEC assemblies 240 and cylindrical TEC 280, which in turn cools the pod 30 (and its contents) which is located in annular recess 210 of nest 140. Note that TEC assemblies 240 cool the outer faces 170 of nest 140 so as to cool outer wall 220 of annular recess 210, whereby to cool hollow outer tube 600 of pod 30, and cylindrical TEC 280 cools hollow cylinder 200 so as to cool inner wall 230 of annular recess 210, whereby to cool hollow inner tube 610 of pod 30. Note that the high surface area-to-volume ratio of pod 30, provided by its toroidal configuration, allows for faster cooling of the pod 30 (and its contents). By way of example but not limitation, the contents of pod 30 can be cooled to a temperature of approximately −30 degrees C. so as to form ice cream within 2 minutes (the contents of pod 30 will turn to ice cream at a temperature of −18 degrees C., a lower temperature will produce ice cream even faster). Note also that the heat removed from pod 30 via TEC assemblies 240 and cylindrical TEC 280 is transferred to heat dissipation assembly 90 for dissipation to the environment.

When pod 30 has been appropriately cooled, water pump 480 pumps an appropriate amount of cold water (e.g., at least 1.25 ounces of cold water) from cold water tank 440 into hollow fang 410 in plunger 330, and then through weakened portion 730 in cap 660, so that the cold water is sprayed into the interior of pod 30 and mixes with the contents of pod 30. In a preferred form of the invention, 4 ounces of water at 2 degrees C. is sprayed into pod 30. At the same time, rotation motor 360 rotates plunger 330, whereby to rotate cap 660 of pod 30, which causes outer helical scraper paddle 670, inner helical scraper paddle 680 and bottom scraper paddle 690 to rotate within annular recess 620 of pod 30.

Note that only cap 660, outer helical scraper paddle 670, inner helical scraper paddle 680 and bottom scraper paddle 690 rotate, and the remainder of pod 30 remains stationary, inasmuch as exit nozzle 820 of pod 30 is disposed in exit nozzle 233 of nest assembly 50.

This rotational action agitates the contents of pod 30 so as to ensure uniform and rapid mixing of the contents of pod 30. In addition, this rotational action causes outer helical scraper paddle 670, inner helical scraper paddle 680 and bottom scraper paddle 690 to continuously scrape the walls of pod 30 so as to prevent the build-up of frozen confection on the walls of pod 30 (which could inhibit cooling of the contents of pod 30). Then air pump 490 pumps air into hollow fang 420 in plunger 330, and then through weakened portion 740 in cap 660, so that the air enters the interior of pod 30 and mixes with the contents of pod 30. Preferably enough air is pumped into pod 30 to provide an approximately 30%-50% overrun (i.e., air bubbles) in pod 30, whereby to give the ice cream the desired "loft". As this occurs, outer helical scraper paddle 670, inner helical scraper paddle 680 and bottom scraper paddle 690 continue to agitate the contents of pod 30 so as to ensure uniform and rapid mixing of the contents of pod 30 and so as to continuously scrape the walls of pod 30, whereby to prevent a build-up of frozen confection on the walls of pod 30 (which could inhibit cooling of the contents of pod 30).

In order to create a "smooth" frozen confection, the majority of ice crystals formed in the frozen confection should be smaller than approximately 50 μm. If many of the ice crystals are larger than 50 μm, or if there are extremely large ice crystals (i.e., over 100 μm) present, the frozen confection will be "coarse". System 10 is designed to produce a "smooth" frozen confection by providing a majority of ice crystals smaller than approximately 50 μm.

More particularly, to develop ice crystals with the proper dispersion (number, size and shape), it is necessary to control the freezing process: rates of nucleation vs. growth of crystals. System 10 does this by simultaneously scraping the inner and outer surfaces of annular recess 620 of pod 30. In addition, in order to generate numerous small ice crystals, the freezing conditions within pod 30 must promote nuclei formation and minimize ice crystal growth. Promoting ice nucleation requires very low temperatures, e.g., ideally as low as −30 degrees C., in order to promote rapid nucleation. System 10 freezes the contents of pod 30 very quickly (e.g., under 2 minutes), thereby preventing ice crystals from having the time to "ripen" (i.e., grow). Furthermore, once ice nuclei have formed, conditions that minimize their growth are needed to keep the ice crystals as small as possible. To obtain the smallest possible ice crystals, it is necessary to have the shortest residence time possible in order to minimize "ripening" (i.e., growth) of the ice crystals. System 10 achieves this by using multiple internal scraper paddles to remove ice crystals from the walls of the pod, which helps create high-throughput rates which keeps the ice crystals small (e.g., under 50 μm).

When the frozen confection in pod 30 is ready to be dispensed into the container which has been placed on tray 130 of machine 20 (i.e., the container from which the frozen confection will be consumed), or into a cone held above tray 130, vertical motor 380 moves plunger 330 vertically, causing plunger 330 to force cap 660 of pod 30 downward, toward base 580 of pod 30, with outer helical scraper paddle 670 and inner helical scraper paddle 680 longitudinally compressing with the advance of cap 660. This action reduces the volume of annular recess 620. Vertical motor 380 continues to move plunger 330 vertically, reducing the volume of annular recess 620, until the force of the frozen confection in pod 30 ruptures weakened portion 810 of pod 30 and the frozen confection is forced out exit port 830 of pod 30, whereupon the frozen confection passes through exit port 234 of nest 140 and into the container set on tray 130 (i.e., the container from which the frozen confection will be consumed) or into the cone held above tray 130. This action continues until cap 660 has been forced against base 580, effectively ejecting all of the frozen confection out of pod 30 and into the container from which the ice cream will be consumed.

Thereafter, the used pod 30 may be removed from machine 20 and, when another single serving of a frozen confection is to be prepared, it may be replaced by a fresh pod 30 and the foregoing process repeated.

Alternative Approaches for Cooling the Inner Portion of the Nest Assembly

Figure 22:
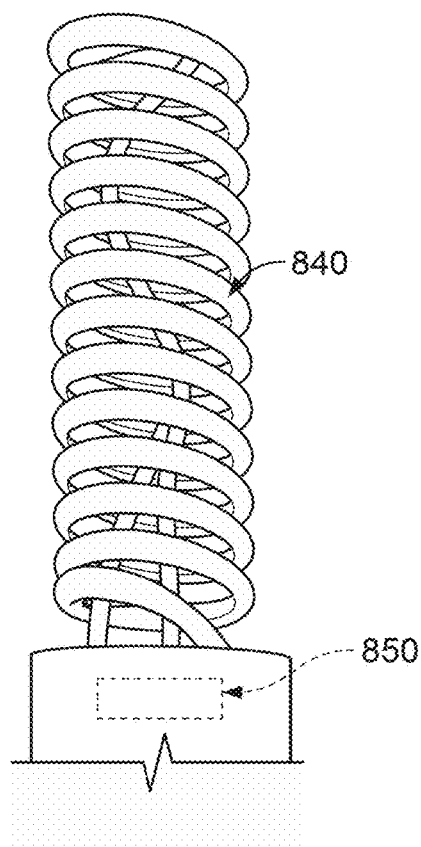
FIGS. 22 and 23 are schematic views showing alternative approaches for cooling the inner portion of the nest assembly of the system shown in FIGS. 1-6.

If desired, and looking now at FIG. 22, cylindrical TEC 280 may be replaced by a helical coil 840 which is itself cooled by a TEC element 850.

Figure 23:
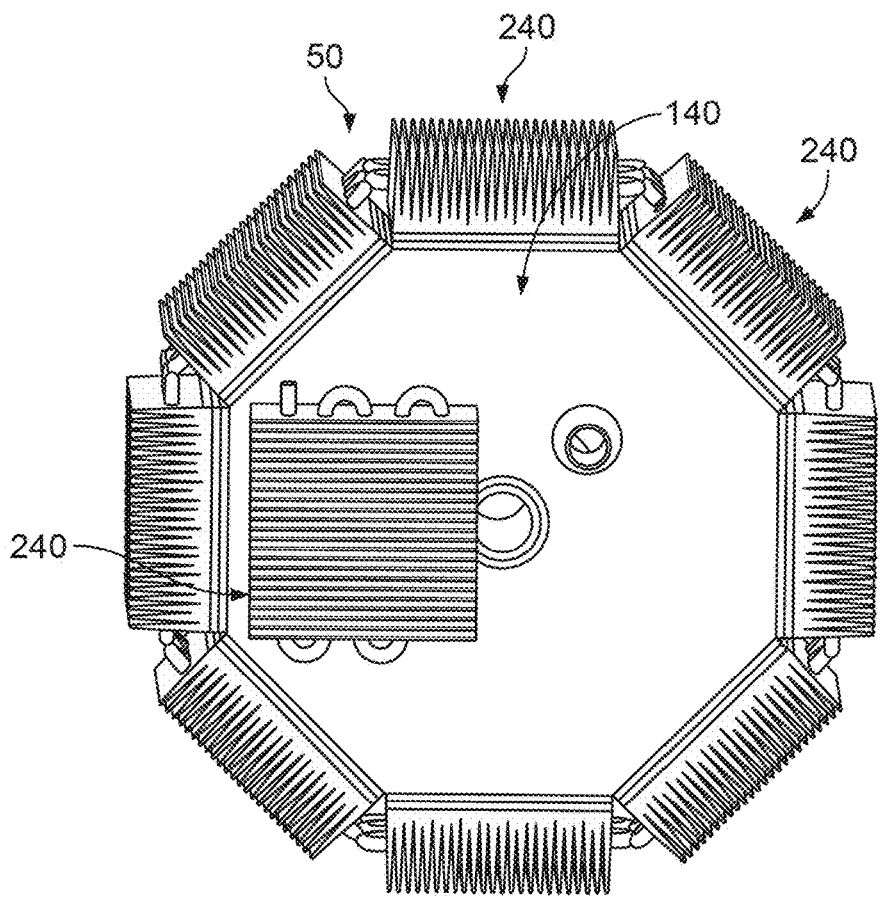
Figure 24:
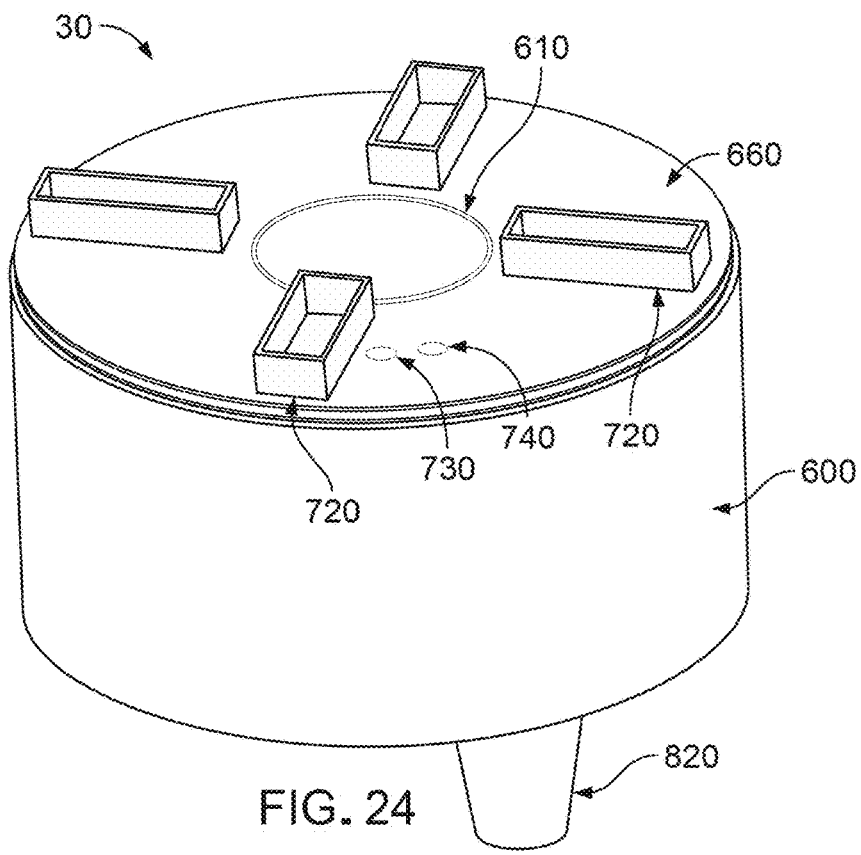
FIGS. 24-27 are schematic views showing another pod which may be used with the system shown in FIGS. 1-6.
Figure 25:
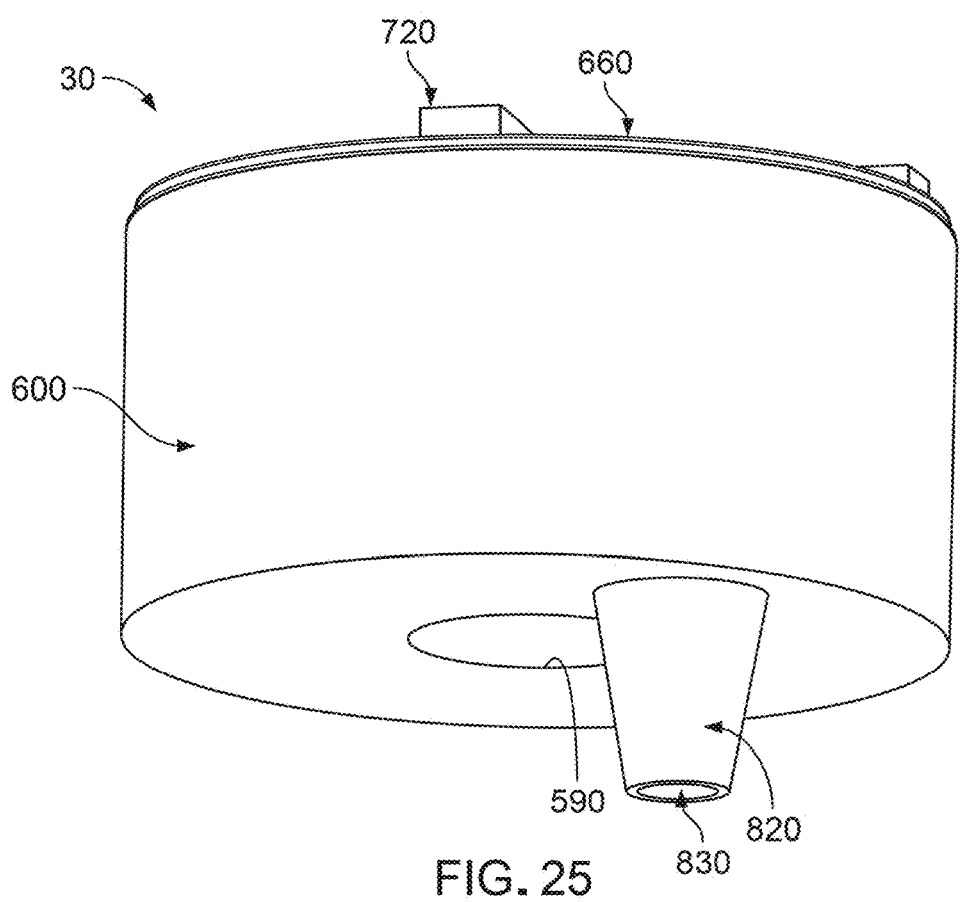
Figure 26:
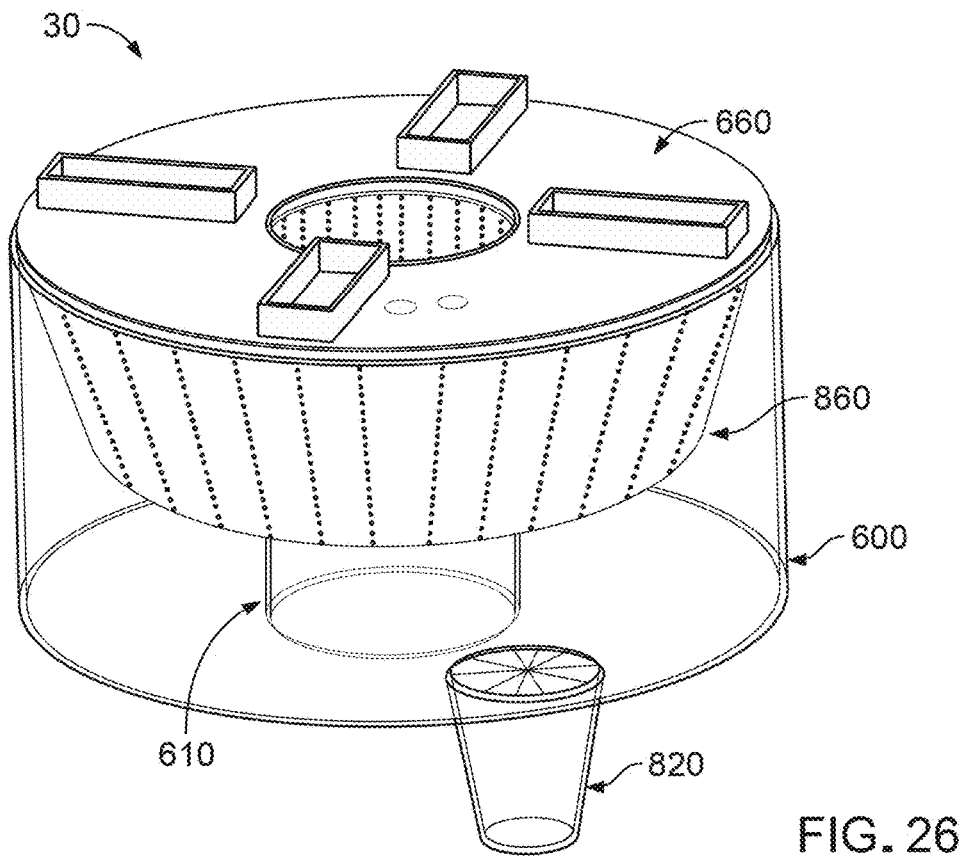
Figure 27:
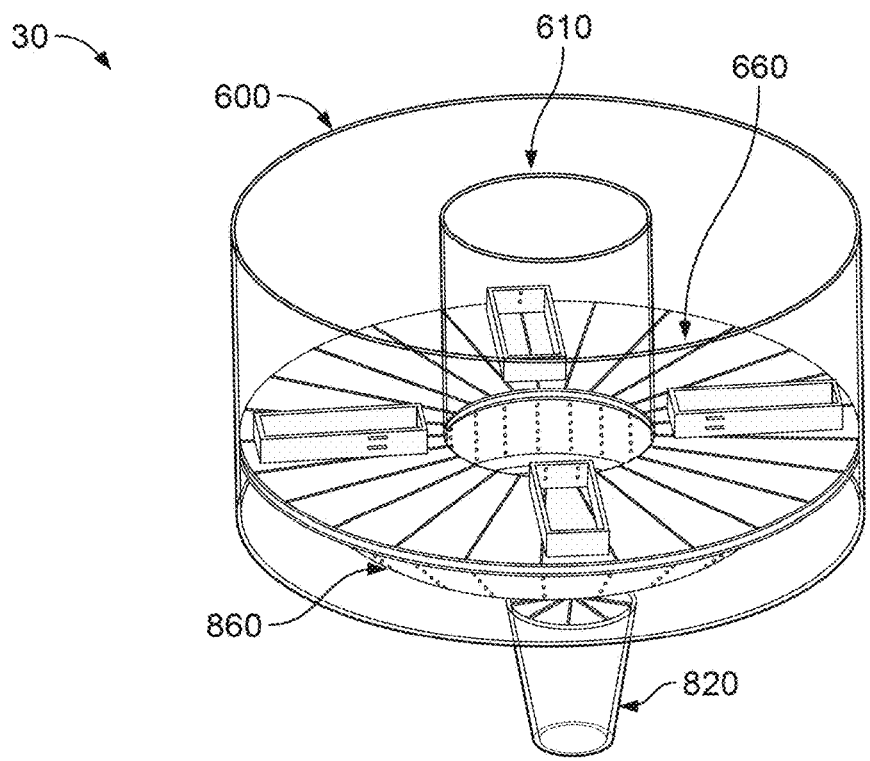

Alternatively, if desired, and looking now at FIG. 23, a TEC assembly 240 may be mounted to bottom surface 160 of nest 140 so that TEC assembly 240 can cool hollow cylinder 200 of nest 140 (as well as the bottom surface of nest 140).

Using the System to Provide a Cold Beverage

System 10 can also be used to provide a single serving of a cold beverage. By way of example but not limitation, pod 30 may contain a supply of ingredients for forming cold tea (also sometimes referred to as "iced tea"), cold coffee (also sometimes referred to as "iced coffee"), cold soda, cold beer, etc. In this circumstance, pod 30 may contain a dry or liquid cold tea mix, a dry or liquid cold coffee mix, a dry or liquid soda mix or a dry or liquid beer mix, etc.

Where system 10 is to be used to provide a single serving of a cold beverage, a pod 30, containing a supply of the ingredients used to form the cold beverage, is inserted into nest assembly 50. Nest assembly 50 is then used to cool pod 30, and cold water is pumped from cold water tank 440 into pod 30, where it is combined with the ingredients contained within pod 30, and mixed by outer helical scraper paddle 670, inner helical scraper paddle 680 and bottom scraper paddle 690. When mixing is completed, vertical motor 380 is activated to eject the cold beverage into a waiting container.

It will be appreciated that where a cold beverage is to be produced, air may or may not be pumped into pod 30 (e.g., air may not be pumped into pod 30 when cold tea or cold coffee is being produced, and air may be pumped into pod 30 when cold soda or cold beer is being produced).

It will also be appreciated that where a cold beverage is to be produced, outer helical scraper paddle 670, inner helical scraper paddle 680 and bottom scraper paddle 690 may be omitted from pod 30 if desired.

Using the System to Provide a Hot Beverage

System 10 can also be used to provide a single serving of a hot beverage. By way of example but not limitation, pod 30 may contain a supply of ingredients for forming a hot beverage, e.g., hot chocolate, hot coffee, etc. In this situation, pod 30 may contain a dry mix formed from ingredients which, when mixed with hot water, provide the desired beverage, e.g., a hot chocolate powder, an instant coffee mix, etc.

Where system 10 is to be used to provide a single serving of a hot beverage, a pod 30, containing a supply of the ingredients used to form the hot beverage, is inserted into nest assembly 50. Nest assembly 50 is then used to heat pod 30, and ambient-temperature water is pumped from ambient-temperature water tank 430 into pod 30, where it is combined with the ingredients contained within pod 30, and mixed by outer helical scraper paddle 670, inner helical scraper paddle 680 and bottom scraper paddle 690. Note that TEC assemblies 240 may be used to supply heat to the outer surfaces of nest 140 by simply reversing the direction of the electric current flow supplied to TEC elements 250, and cylindrical TEC 290 may be used to supply heat to the inner column of nest 140, whereby to heat the contents of pod 30.

In addition, if desired, the ambient-temperature water in ambient-temperature water tank 430 may be heated before injection into pod 30, e.g., via resistance heaters positioned in the line between ambient-temperature water tank 430 and hollow fang 410 of plunger 330. It will be appreciated that where a hot beverage is to be produced, air is generally not pumped into pod 30.

In many cases, it may be desirable to "brew" a hot beverage by passing water through a supply of granulated ingredients, e.g., as in the case of coffee or tea. To that end, and looking now at FIGS. 24-27, pod 30 can be provided with a filter 860 which contains a supply of the granulated ingredients (e.g., ground coffee beans, tea leaves, etc.) which is to be brewed. In one preferred form of the invention, and as shown in FIGS. 24-27, filter 860 is disposed adjacent to cap 660, e.g., filter 860 is secured to cap 660, and outer helical scraper paddle 670, inner helical scraper paddle 680 and bottom scraper paddle 690 are omitted from pod 30. Note also that when plunger 330 collapses cap 660 towards base 580, filter 860 will preferably also collapse, whereby to allow compression of the granulated ingredients contained within filter 860, so as to press the fluid out of filter 860, e.g., in the manner of a so-called "French Press" coffee maker. It should also be appreciated that filter 860 is constructed so that it will maintain its structural integrity during collapse so that the granulated contents of filter 860 do not pass out of pod 30.

Alternative Configuration

Figure 28:
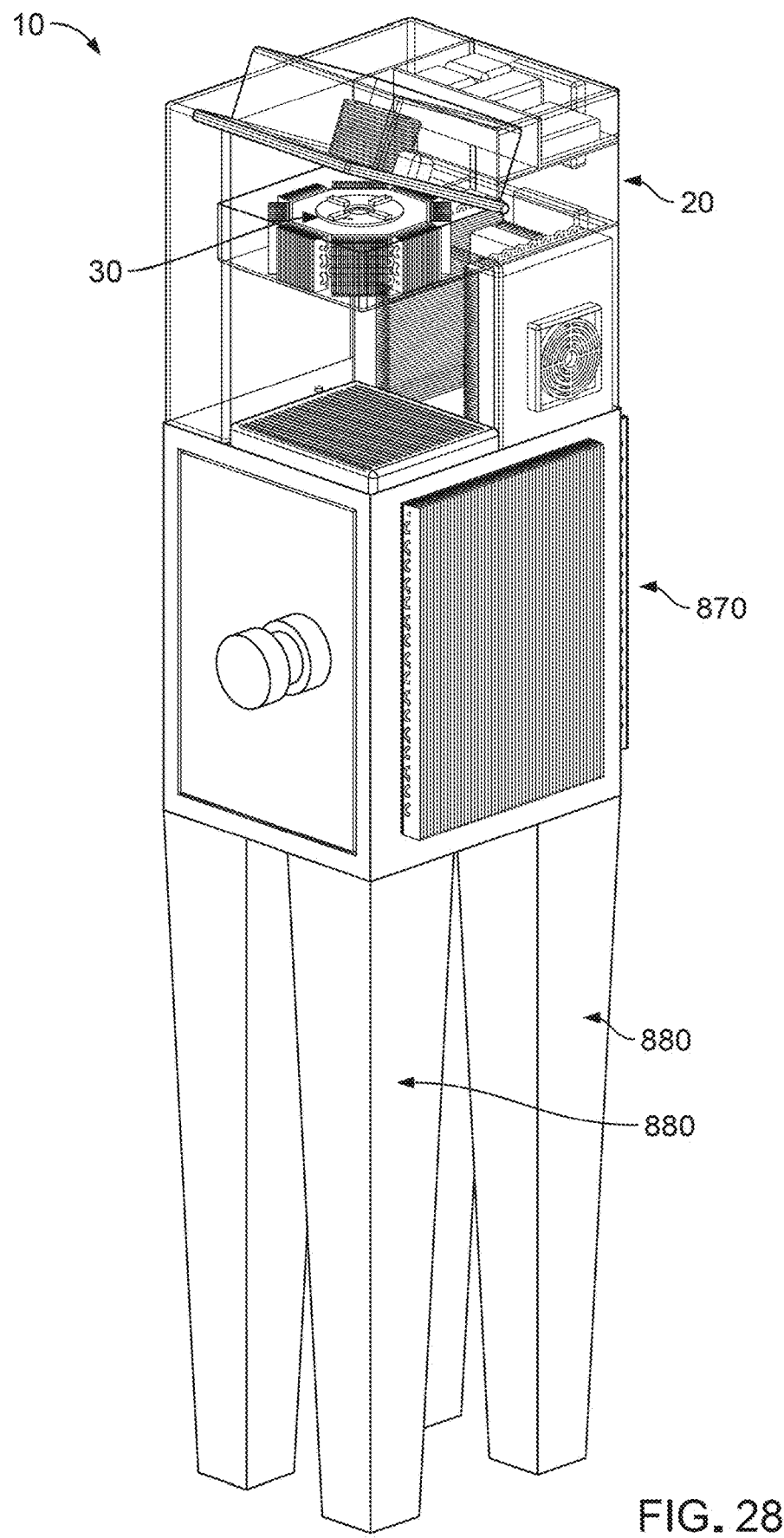
FIG. 28 is a schematic view showing another novel system for providing a single serving of a frozen confection.

If desired, and looking now at FIG. 28, machine 20 can be mounted to a cabinet 870, where cabinet 870 sits on legs 880. In this construction, cabinet 870 can include additional cooling apparatus for removing heat from heat dissipation assembly 90 (e.g., additional heat pipes, condensers and fans, or a conventional refrigeration unit, etc.). Cabinet 870 may also be configured so as to house fresh pods 30 and/or containers for receiving the frozen confections (e.g., bowls and cones), cold beverages (e.g., cups) and hot beverages (e.g., cups).

Chilling the Pod with a Refrigeration Coil

Figure 30:
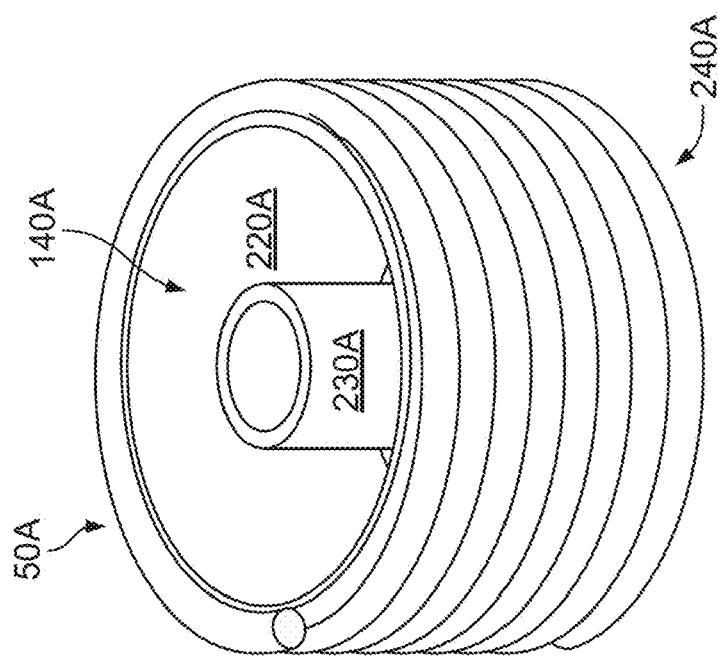
FIGS. 29-31 are schematic views showing another novel system for providing a single serving of a frozen confection.
Figure 29:
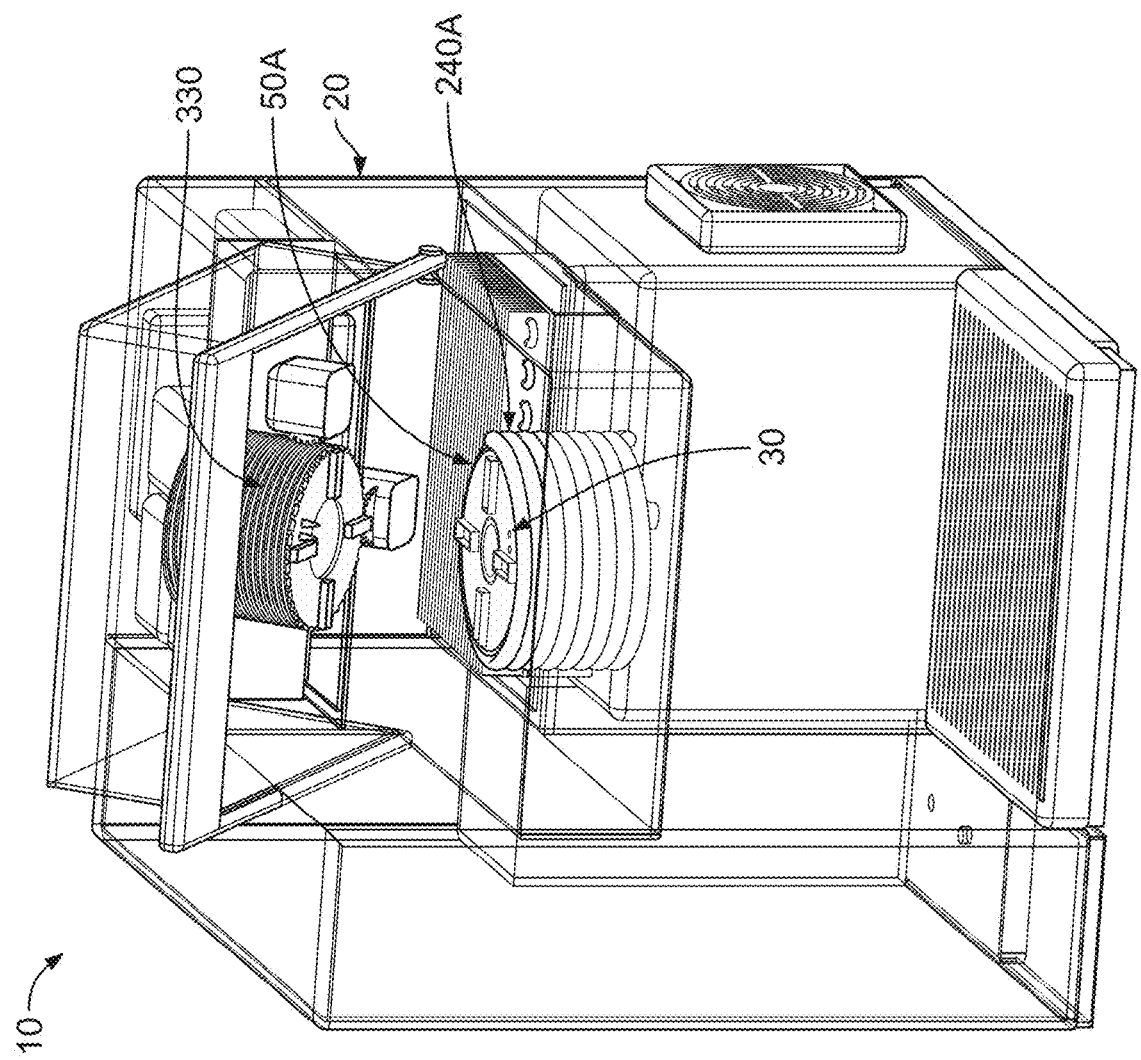
Figure 31:
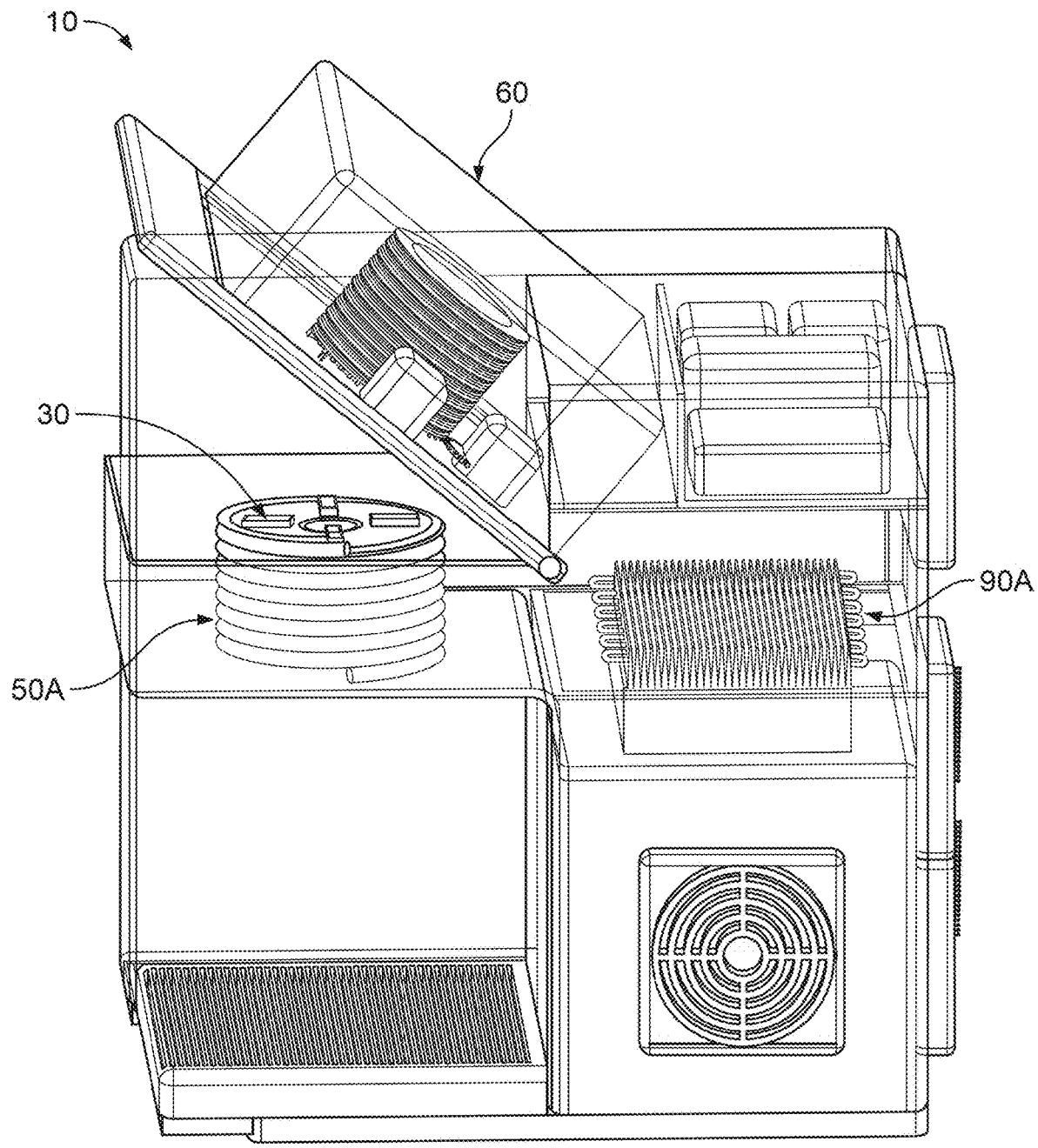

In another form of the invention, and looking now at FIGS. 29-31, nest assembly 50 may be replaced by an alternative nest assembly 50A comprising a nest 140A in the form of a torus characterized by an outer wall 220A and an inner wall 230A, wherein the torus is formed out of a high heat-transfer material (e.g., aluminum), and further wherein TEC assemblies 240 are replaced by a refrigeration coil 240A which is connected to heat dissipation assembly 90A, wherein heat dissipation assembly 90A comprises a compressor for driving refrigeration coil 240A. It will be appreciated that, as a result of this construction, nest assembly 50A (and hence a pod 30 disposed in nest assembly 50A) can be cooled via a conventional refrigeration system. This construction can be advantageous since it can quickly cool a pod 30 to –40 degrees C., which is beyond the thermal performance of TEC elements 250.

Alternative Nest and Pod Constructions

In the foregoing disclosure, nest assembly 50 and nest assembly 50A comprise an internal cooling element (e.g., hollow cylinder 200 containing TEC 280) as well as external cooling elements (e.g., TEC assemblies 240), and pod 30 comprises an inner opening (i.e., the lumen of inner hollow tube 610) for receiving the internal cooling element of nest assemblies 50 and 50A. However, if desired, the internal cooling element may be omitted from nest assemblies 50 and 50A, in which case the inner opening of pod 30 may also be omitted.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A machine for providing a single serving of a cold beverage or a frozen confection, the machine comprising:
a cooling system comprising a compressor for driving refrigeration fluid through the cooling system;
a first assembly comprising the cooling system, the first assembly having sidewalls partially defining a recess for receiving a pod containing at least one ingredient for forming the single serving of the cold beverage or frozen confection and at least one internal paddle, the cooling system operable to cool the assembly; and
a second assembly comprising:
a lid,
a plunger movably mounted to the lid, the plunger operable to engage a top of the pod and rotate the at least one internal paddle of the pod to scrape the cold beverage or a frozen confection off a wall of the pod and mix contents of the pod, to increase overrun volume of the at least one ingredient within the pod by mixing air flowing into the pod through an opening in an end wall of the pod with the at least one ingredient of the pod, and to dispense, the plunger comprising a circumferential gear and a longitudinal gear;
a rotation motor operable to drive a rotation gear; and
a vertical motor operable to drive a vertical gear, the rotation gear of rotation motor engaging the circumferential gear of the plunger and the vertical gear of vertical motor engaging the longitudinal gear of the plunger.

2. The machine of claim 1, wherein the plunger is configured to engage the top of the pod by engaging at least one protrusion of the plunger into at least one recess on the top of the pod.

3. The machine of claim 2, the plunger is configured to rotate the at least one internal paddle of the pod by coupling a rotation of the plunger to the rotation of the at least one internal paddle of the pod.

4. The machine of claim 1, wherein the internal paddle is a helical paddle.

5. The machine of claim 1, wherein sidewalls of the first assembly that define the recess are made of aluminum.

6. The machine of claim 1, wherein the first assembly comprises an exit nozzle mounted to a bottom surface of the assembly at a bore of the assembly.

7. The machine of claim 1, further comprising a water supply for introducing water into the pod, wherein the water supply comprises at least one water tank.

8. The machine of claim 7, further comprising an air pump for introducing air into the pod.

9. The machine of claim 7, wherein the machine is operable to heat the pod.

10. The machine of claim 1, wherein the first assembly includes a bore extending from a bottom surface of a nest and aligned with an outlet of the pod to dispense the cold beverage or frozen confection forced out of the pod by rotation of the internal paddle directly into a container or cone without coming into contact with other portions of the machine.

11. The machine of claim 1, wherein the cooling assembly comprises a refrigeration coil.

12. The machine of claim 11, wherein the refrigeration coil is operable to cool the cooling assembly.

13. A machine for providing a single serving of a cold beverage or frozen confection, the machine comprising:
- a cooling system assembly comprising a compressor for driving refrigeration fluid through the cooling system, the cooling system assembly defining a recess for receiving a pod containing at least one ingredient for forming a single serving of the cold beverage or frozen confection and at least one internal paddle, the assembly operable to cool the assembly; and
- a lid assembly comprising:
  - a lid,
  - a plunger movable mounted to the lid, the plunger comprising a circumferential gear and a longitudinal gear, the plunger to engage a top of the pod and to rotate the at least one internal paddle of the pod to dispense the cold beverage or frozen confection forced out of the pod by rotation of the internal paddle directly into a container or cone without coming into contact with other portions of the machine;
  - a rotation motor operable to drive a rotation gear; and
  - a vertical motor operable to drive a vertical gear, the rotation gear of rotation motor engaging the circumferential gear of the plunger and the vertical gear of vertical motor engaging the longitudinal gear of the plunger;
- wherein walls of the cooling assembly that define the recess are made of aluminum.

14. The machine of claim 13, wherein the cooling system assembly comprises an exit nozzle mounted to a bottom surface of the assembly at a bore of the assembly.

15. The machine of claim 13, wherein the cooling assembly comprises a refrigeration coil.

16. The machine of claim 15, wherein the refrigeration coil is operable to cool the cooling assembly.

17. A machine for providing a single serving of a cold beverage or a frozen confection, the machine comprising:
- a cooling assembly comprising a compressor for driving refrigeration fluid through the cooling assembly;
- a first assembly comprising the cooling assembly, the first assembly having sidewalls partially defining a recess for receiving a pod containing at least one ingredient for forming the single serving of the cold beverage or frozen confection and at least one internal paddle, the cooling assembly operable to cool the assembly; and
- a second assembly comprising:
  - a lid,
  - a plunger movable mounted to the lid, the plunger comprising a circumferential gear and a longitudinal gear, the plunger to engage a top of the pod and to rotate the at least one internal paddle of the pod to dispense the cold beverage or frozen confection forced out of the pod by rotation of the internal paddle directly into a container or cone without coming into contact with other portions of the machine;
  - a rotation motor connected to the circumferential gear, the rotational motor operable to drive rotation of the circumferential gear of the plunger; and
  - a vertical motor connected to the longitudinal gear, the rotational motor operable to drive rotation of the longitudinal gear.

18. The machine of claim 17, wherein the cooling assembly comprises an exit nozzle mounted to a bottom surface of the assembly at a bore of the assembly.

19. The machine of claim 17, the plunger is configured to rotate the at least one internal paddle of the pod by coupling a rotation of the plunger to the rotation of the at least one internal paddle of the pod.

20. The machine of claim 17, wherein the first assembly includes a bore extending from a bottom surface of a nest and aligned with an outlet of the pod to dispense the cold beverage or frozen confection forced out of the pod by rotation of the internal paddle directly into a container or cone without coming into contact with other portions of the machine.

21. The machine of claim 17, wherein the plunger is configured to engage a top of the pod and to rotate the at least one internal paddle of the pod to scrape the cold beverage or a frozen confection off a wall of the pod and mix contents of the pod and to increase overrun volume of the at least one ingredient within the pod by mixing air flowing into the pod through an opening in an end wall of the pod with the at least one ingredient of the pod.

22. The machine of claim 17, wherein the cooling assembly comprises a refrigeration coil.

23. The machine of claim 22, wherein the refrigeration coil is operable to cool the cooling assembly.

* * * * *